United States Patent
Lee et al.

(10) Patent No.: US 12,010,669 B2
(45) Date of Patent: Jun. 11, 2024

(54) METHOD AND DEVICE FOR ACTIVATING AND INACTIVATING BANDWIDTH PART IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/364,087

(22) Filed: Aug. 2, 2023

(65) Prior Publication Data

US 2023/0397180 A1    Dec. 7, 2023

Related U.S. Application Data

(63) Continuation of application No. PCT/KR2022/014809, filed on Sep. 30, 2022.

(30) Foreign Application Priority Data

Oct. 1, 2021    (KR) .................. 10-2021-0130953

(51) Int. Cl.
*H04W 72/0457* (2023.01)
*H04L 1/1812* (2023.01)
(Continued)

(52) U.S. Cl.
CPC ....... *H04W 72/0457* (2023.01); *H04L 1/1861* (2013.01); *H04W 72/232* (2023.01); *H04W 76/27* (2018.02); *H04L 1/1812* (2013.01)

(58) Field of Classification Search
CPC ............. H04W 72/0457; H04W 76/27; H04W 72/232; H04L 1/1861; H04L 1/1812
See application file for complete search history.

(56) References Cited

U.S. PATENT DOCUMENTS

| | | |
|---|---|---|
| 2019/0182870 A1 | 6/2019 | Shih et al. |
| 2023/0049868 A1* | 2/2023 | Zhou ............... H04L 1/1896 |
| 2023/0254933 A1* | 8/2023 | Han ................ H04L 1/1812 370/312 |

FOREIGN PATENT DOCUMENTS

WO    WO-2022086213 A1 *    4/2022

OTHER PUBLICATIONS

English Translation WO 2022086213 A1, Clavirate Analytics, 2023 (Year: 2023).*

(Continued)

*Primary Examiner* — Maharishi V Khirodhar
*Assistant Examiner* — Kenneth P Hunt
(74) *Attorney, Agent, or Firm* — LEE, HONG, DEGERMAN, KANG & WAIMEY

(57) ABSTRACT

A method and an apparatus for transmitting or receiving hybrid automatic repeat request-acknowledgement (HARQ-ACK) information in a wireless communication system are disclosed. A method of transmitting hybrid automatic repeat request-acknowledgement (HARQ-ACK) information by a terminal in a wireless communication system according to an embodiment of the present disclosure may comprise: receiving, from a network, a first physical downlink shared channel (PDSCH) based on a first HARQ-ACK reporting mode; receiving, from the network, a second PDSCH based on a second HARQ-ACK reporting mode; and transmitting, to the network, the HARQ-ACK information based on a sequence in which a first bit corresponds to the first HARQ-ACK reporting mode and a second bit corresponds to the second HARQ-ACK reporting mode.

10 Claims, 11 Drawing Sheets

(51) Int. Cl.
*H04L 1/1829* (2023.01)
*H04W 72/232* (2023.01)
*H04W 76/27* (2018.01)

(56) References Cited

OTHER PUBLICATIONS

PCT International Application No. PCT/KR2022/014809, International Search Report dated Jan. 12, 2023, 3 pages.
ZTE, "Discussion on mechanisms to Support Group Scheduling for RRC_CONNECTED UEs," R1-2108851, 3GPP TSG RAN WG1 #106b-e, e-Meeting, Oct. 2021, 18 pages.
ZTE et al., "Group scheduling and power saving of NR MBS," R2-2107337, 3GPP TSG-RAN WG2 Meeting #115 electronic, Online, Aug. 2021, 7 pages.
TD Tech et al., "Group scheduling related questions for RRC_CONNECTED UEs," R1-2109767, 3GPP TSG RAN WG1 Meeting#106bis-e, e-Meeting, Oct. 2021, 6 pages.
Mediatek Inc., "DRX scheme for NR MBS," R2-2107049, 3GPP TSG-RAN WG2 Meeting #115 electronic, Online, Aug. 2021, 5 pages.
Korean Intellectual Property Office Application No. 10-2023-7021615, Office Action dated Sep. 13, 2023, 5 pages.
Ericsson, "Open issues group scheduling," R2-2105654, 3GPP TSG-RAN2 Meeting #114-e, eMeeting, May 2021, 10 pages.

\* cited by examiner

METHOD AND DEVICE FOR ACTIVATING AND INACTIVATING BANDWIDTH PART IN WIRELESS COMMUNICATION SYSTEM

CROSS-REFERENCE TO RELATED APPLICATIONS

This application is a continuation of International Application No. PCT/KR2022/014809, filed on Sep. 30, 2022, which claims the benefit of earlier filing date and right of priority to Korean Application No. 10-2021-0130953, filed on Oct. 1, 2021, the contents of which are all hereby incorporated by reference herein in their entireties.

TECHNICAL FIELD

The present disclosure relates to a wireless communication system, and more particularly, to a method and a device for activating or inactivating a bandwidth part (BWP) in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and a device for activating or inactivating a bandwidth part (BWP) in a wireless communication system.

An additional technical problem of the present disclosure is to provide a method and a device for activating or inactivating a BWP based on a timer in a wireless communication system.

An additional technical problem of the present disclosure is to provide a method and a device for activating or inactivating a BWP based on a timer related to multicast or broadcast in a wireless communication system.

The technical objects to be achieved by the present disclosure are not limited to the above-described technical objects, and other technical objects which are not described herein will be clearly understood by those skilled in the pertinent art from the following description.

A method of receiving a downlink channel by a terminal in a wireless communication system according to an aspect of the present disclosure includes receiving a physical downlink control channel (PDCCH) from a network at a first bandwidth part (BWP) based on a specific group-radio network temporary identifier (G-RNTI); and receiving a group common physical downlink shared channel (PDSCH) from the network based on the PDCCH, and the specific G-RNTI is configured for first type group common scheduling or is configured for second type group common scheduling, and a first inactivity timer may be started or restarted based on the specific G-RNTI configured for the first type group common scheduling.

A method of transmitting a downlink channel by a base station in a wireless communication system according to an additional aspect of the present disclosure includes transmitting a physical downlink control channel (PDCCH) to at least one terminal at a first bandwidth part (BWP) based on a specific group-radio network temporary identifier (G-RNTI); and transmitting a group common physical downlink shared channel (PDSCH) to the at least one terminal based on the PDCCH, and the specific G-RNTI is configured for first type group common scheduling or is configured for second type group common scheduling, and a first inactivity timer may be started or restarted based on the specific G-RNTI configured for the first type group common scheduling.

According to the present disclosure, a method and a device for activating or inactivating a bandwidth part (BWP) in a wireless communication system may be provided.

According to the present disclosure, a method and a device for activating or inactivating a BWP based on a timer in a wireless communication system may be provided.

According to the present disclosure, a method and a device for activating or inactivating a BWP based on a timer related to multicast or broadcast in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
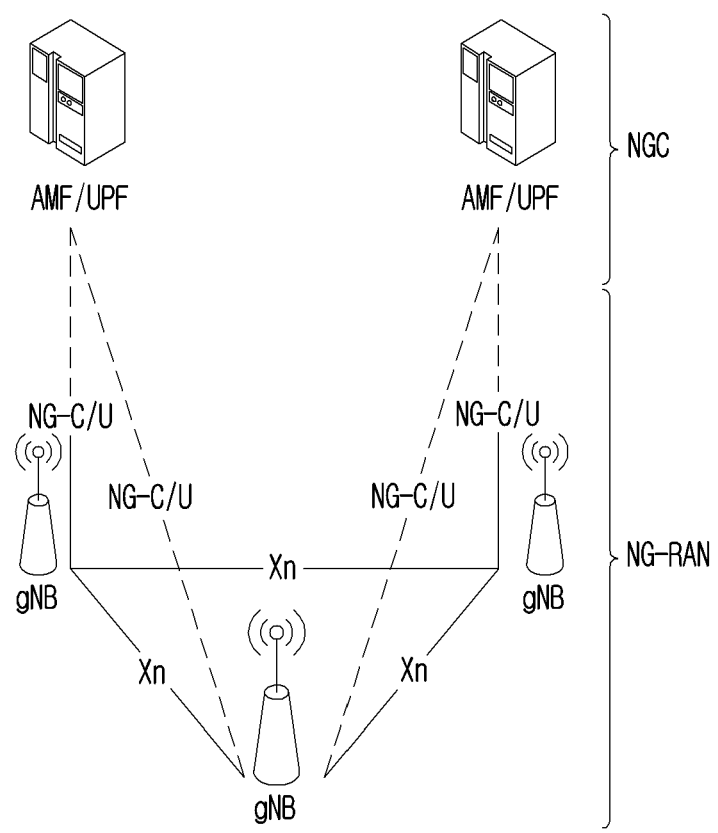
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
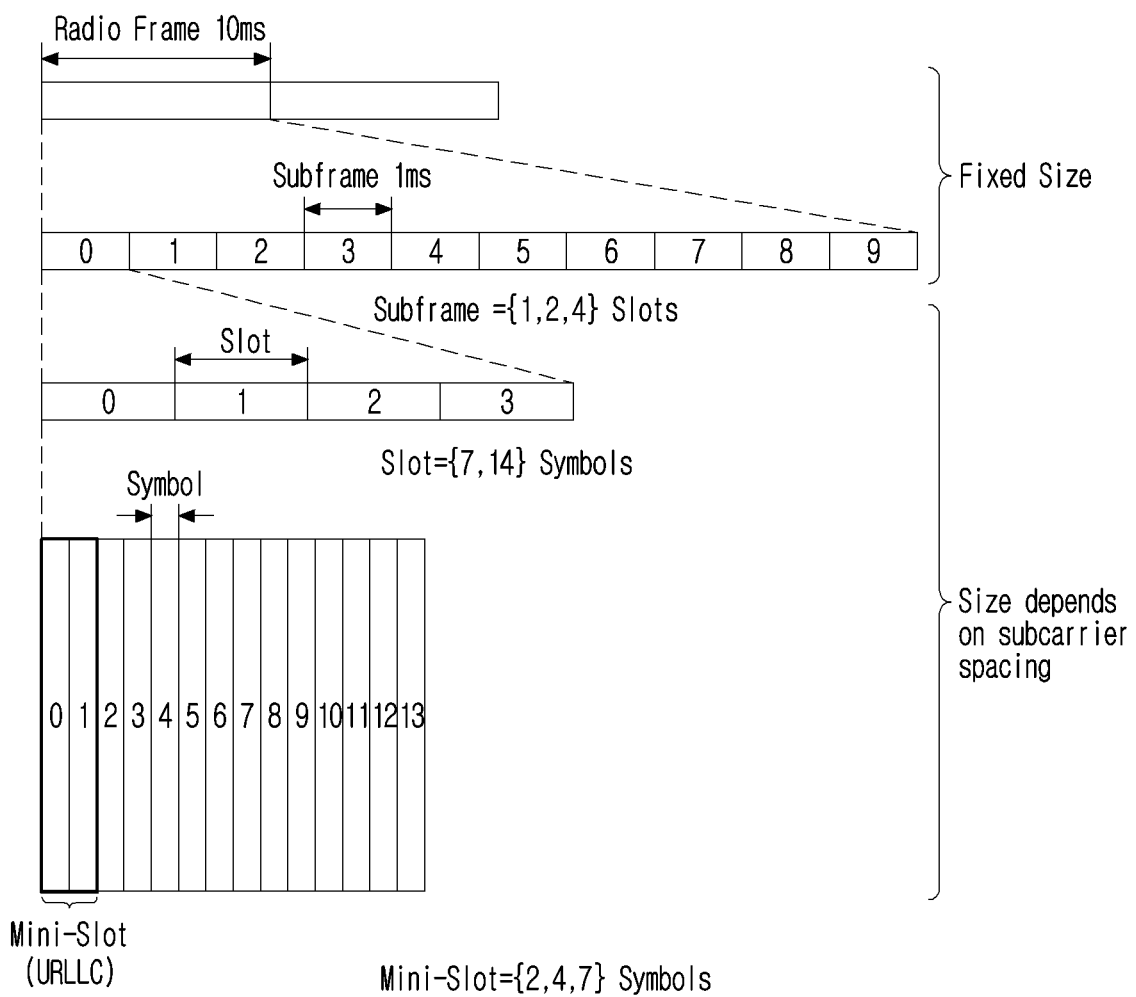
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^\mu \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and N f is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} \cdot N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset}) \cdot T_c$ than a corresponding downlink frame in a corresponding terminal starts. For a subcarrier spacing configuration slots are numbered in an increasing order of $n_s^\mu \in \{0, \ldots, N_{slot}^{subframe,\mu}-1\}$ in a subframe and are numbered in an increasing order of $n_s^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on 11=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
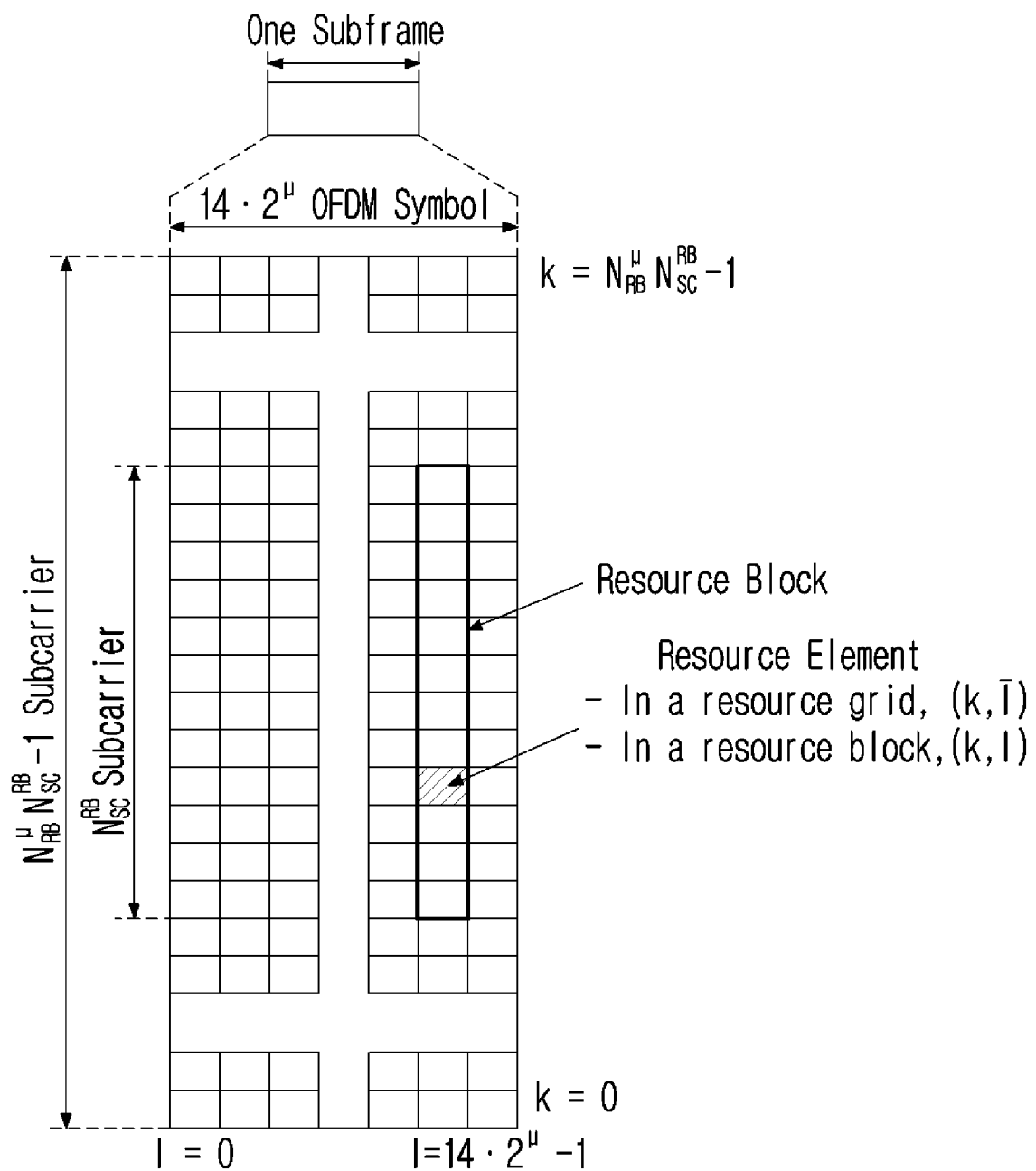
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with 14.2μ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for μ, and an antenna port p corresponds to a complex value, $a_{k,l}^{(p,\mu)}$. When there is no risk of confusion or when a specific antenna port or numerology is not specified, indexes p and μ may be dropped, whereupon a complex value may be $a_{k,l}^{(p)}$ or $a_{k,l}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
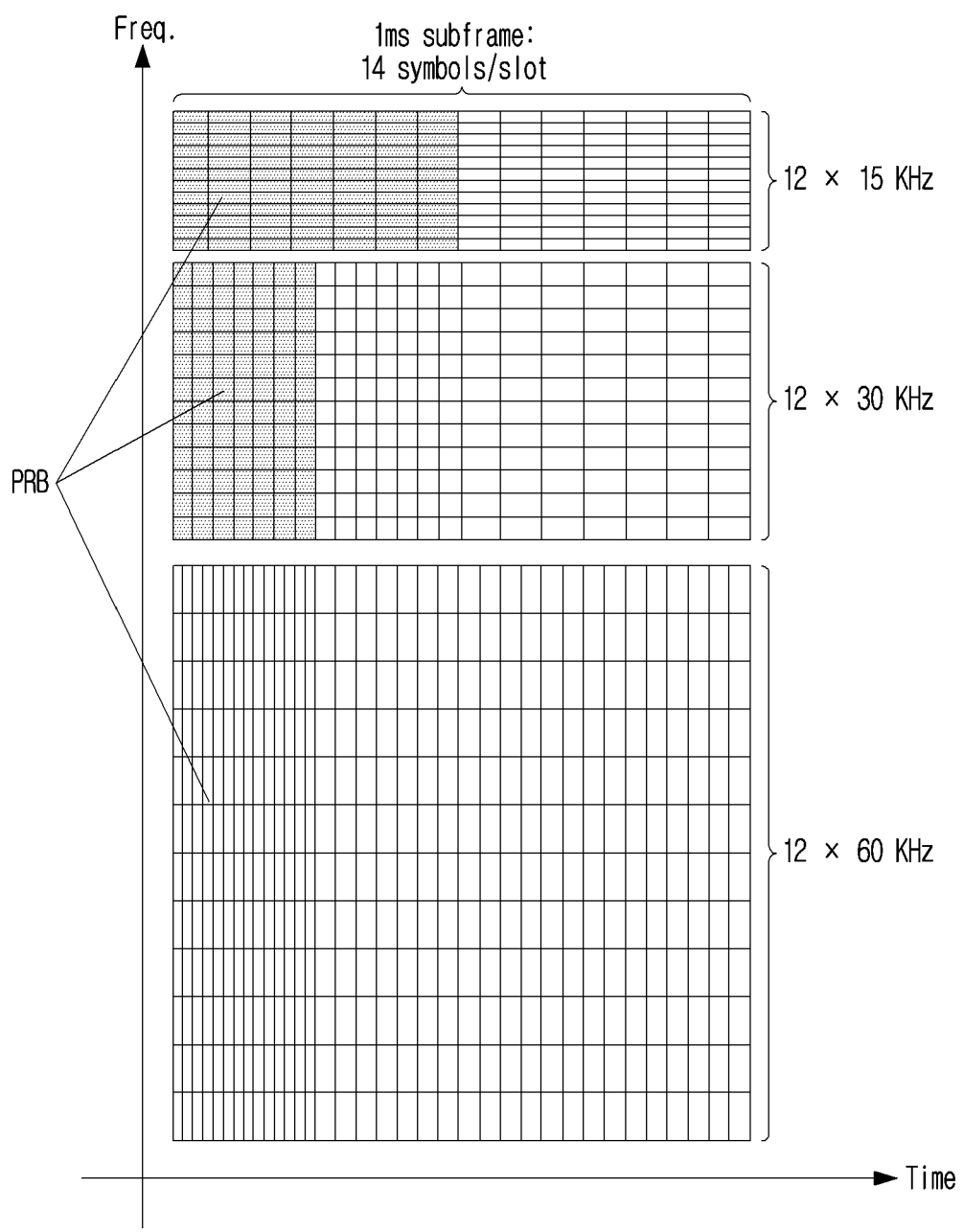
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
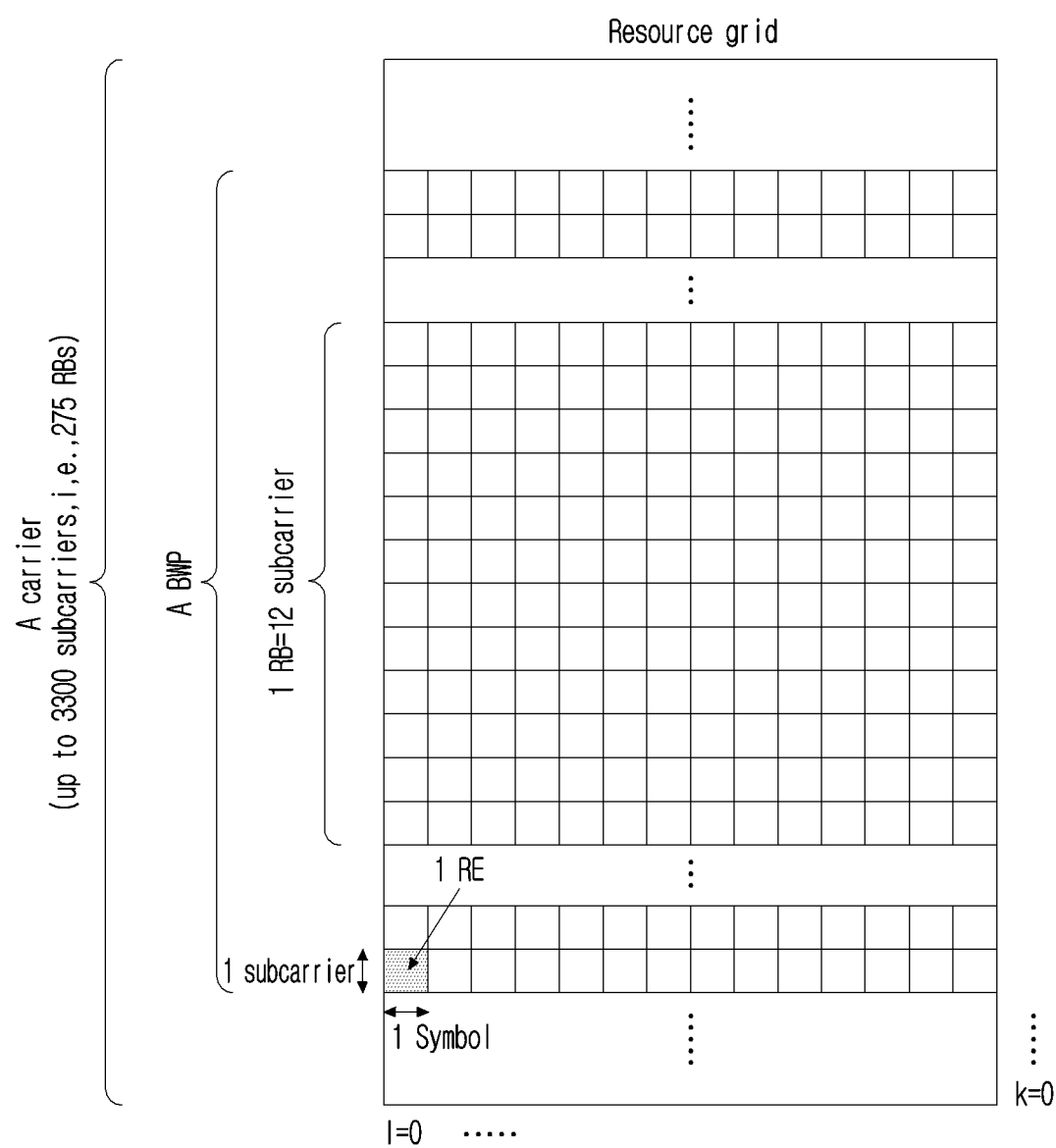
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
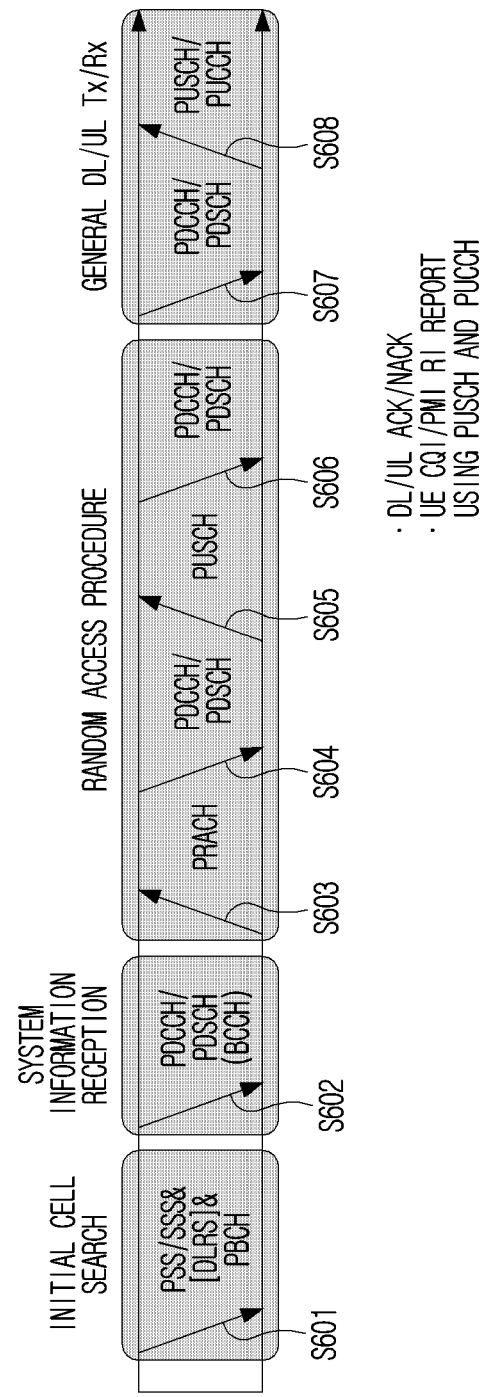
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement)

signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation and Coding Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

MBMS (Multimedia Broadcast Multicast Service)

MBMS may include a single frequency network (SFN) scheme in which a plurality of base stations or a plurality of cells are synchronized to transmit the same data to a terminal, and a single cell point to multipoint (SC-PTM) scheme for broadcasting within the corresponding cell coverage through the PDCCH/PDSCH channel.

SFN scheme may be used to provide a broadcast service to a wide area (e.g., MBMS area) through resources allocated semi-statically in advance. A multicast broadcast single frequency network (MBSFN) provides logical channels, a multicast control channel (MCCH) and a multicast traffic channel (MTCH), and both of the MCCH and the MTCH are mapped to a transport channel, a multicast channel (MCH), and the MCH is mapped to a physical channel, a physical multicast channel (PMCH). That is, a plurality of base stations/cells may be synchronized to provide the same data to a terminal through the PMCH. One base station/cell may belong to a plurality of MBSFN areas. In addition, it may be required to configure the MBSFN subframe for the MBSFN service.

SC-PTM scheme may be mainly used to provide a broadcast service only within a cell coverage through dynamic resources. SC-PTM provides one logical channel, SC-MCCH (Single Cell Multicast Control Channel) and one or more logical channels SC-MTCH (Single Cell Multicast Traffic Channel). These logical channels (i.e., SC-MCCH and SC-MTCH) are mapped to the transport channel, DL-SCH, and the transport channel DL-SCH is mapped to the physical channel PDSCH. A PDSCH transmitting data corresponding to the SC-MCCH or SC-MTCH is scheduled through a PDCCH that is CRC scrambled with a group-radio network temporary identifier (G-RNTI). Here, a temporary mobile group identity (TMGI) corresponding to the MBMS service ID may be mapped one-to-one with a specific G-RNTI value. Accordingly, if the base station provides a plurality of MBMS services, a plurality of G-RNTI values may be allocated for SC-PTM transmission. One or more terminals may perform PDCCH monitoring using a specific G-RNTI to receive a specific MBMS service. Here, a discontinuous reception (DRX) on-duration period dedicated to SC-PTM may be configured for a specific MBMS service/specific G-RNTI. In this case, the corresponding terminals may wake up only for a specific on-duration period and perform PDCCH monitoring for the G-RNTI.

SPS (Semi-Persistent Scheduling)

The base station may provide a specific terminal with SPS configuration dedicated to the terminal, and allocate one or more downlink SPS transmission resources that are repeated according to a configured period. DCI of terminal-dedicated (or terminal-specific) PDCCH may indicate activation (SPS activation) of a specific SPS configuration index. The terminal may perform downlink reception through the activated SPS transmission resource. Such SPS transmission resource may be used for initial HARQ transmission. The base station may allocate a retransmission resource of a specific SPS configuration index through DCI of PDCCH dedicated to a terminal. For example, when the terminal reports HARQ NACK for the SPS transmission resource, the base station may allocate the retransmission resource through DCI so that the terminal may receive downlink retransmission.

DCI of PDCCH dedicated to a terminal may indicate release or deactivation of a specific SPS configuration index. In this case, the corresponding terminal does not receive the SPS transmission resource for which release/deactivation is indicated.

CRC of DCI/PDCCH for activation/retransmission/deactivation for SPS configuration/resource may be scrambled by configured scheduling-radio network temporary identifier (CS-RNTI).

MBS (Multicast Broadcast Service)

In the NR-based wireless communication system, introduction of a new MBS-based DL broadcast or DL multicast transmission scheme, which is distinct from the aforementioned MBMS (e.g., MBSFN or SC-PTM), is being discussed. For example, the network side (e.g., base station/cell/TRP) may provide a point-to-multipoint (PTM) transmission scheme and a point-to-point (PTP) transmission scheme for DL broadcast or DL multicast transmission.

In the PTM transmission scheme for MBS, the base station may transmit a group common (or group-specific) PDCCH and a group common PDSCH to a plurality of terminals. A plurality of terminals may simultaneously receive the same group common PDCCH transmission and group common PDSCH transmission, and decode the same MBS data.

In the PTP transmission scheme for MBS, the base station may transmit a terminal-dedicated (or terminal-specific) PDCCH and a terminal-dedicated PDSCH to a specific terminal. The corresponding single terminal may receive the terminal-dedicated PDCCH and a terminal-dedicated PDSCH. When there are a plurality of terminals receiving the same MBS service, the base station may individually transmit the same MBS data to each of the plurality of terminals through different terminal-dedicated PDCCHs and terminal-dedicated PDSCHs.

Figure 7:
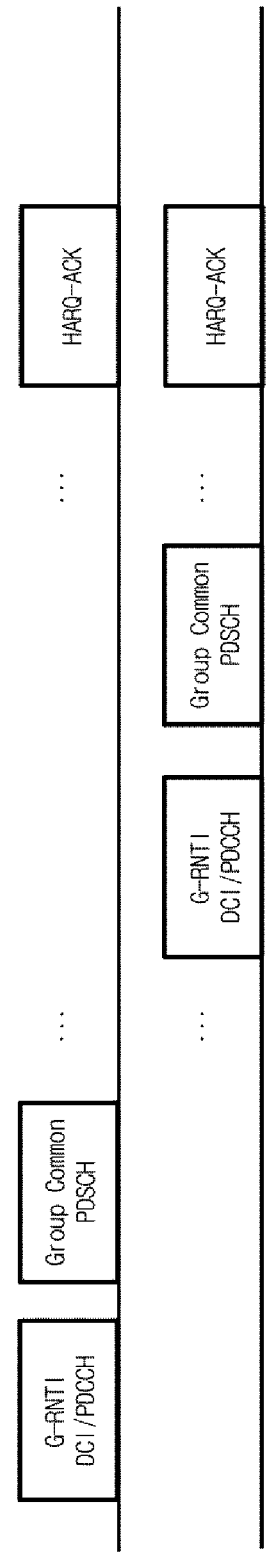
FIG. 7 is a diagram showing an example of a group common PDSCH to which the present disclosure may be applied and HARQ-ACK transmission therefor.

FIG. 7 is a diagram showing an example of a group common PDSCH to which the present disclosure may be applied and HARQ-ACK transmission therefor.

In the present disclosure, if there is a MBS configuration in a current active BWP and there is no MBS configuration in a default/initial BWP, a terminal may not drive a timer for switching or inactivation, etc. In the present disclosure, if there is no MBS configuration in a current active BWP and there is also no MBS configuration in a default/initial BWP, a terminal may drive a timer according to PDCCH reception of a current active BWP. In the present disclosure, if there is a MBS configuration in a current active BWP and there is also a MBS configuration in a default/initial BWP, a terminal may drive a timer according to PDCCH reception of a current active BWP.

As in an example of FIG. 7, a terminal may receive group common PDCCHs/PDSCHs scheduled by a different G-RNTI through FDM or TDM. A base station may configure a common frequency resource (CFR), a frequency domain similar to a BWP, and a terminal may receive a group common PDCCH/PDSCH through a CFR. A terminal in a RRC connected mode may activate one DL BWP to receive a unicast PDCCH/PDSCH, and receive a group common PDCCH/PDSCH through a CFR connected to an activated DL BWP. Here, a terminal may transmit multicast HARQ-ACK (e.g., HARQ ACK/NACK) for a group common PDCCH/PDSCH. A terminal in a RRC idle mode or in an inactive mode may receive a group common PDCCH through a CFR connected to an initial DL BWP.

A terminal in a RRC idle or inactive mode may receive a group common PDCCH/PDSCH for broadcast through an initial BWP or a CFR including an initial BWP. When a CFR is configured as a bandwidth wider than an initial BWP, a terminal may receive a bandwidth equal to a CFR only during a time duration when a service of interest is transmitted. During a time duration when a service of interest is not transmitted, a terminal may receive only a bandwidth of an initial BWP. Here, a bandwidth of an initial BWP may correspond to a bandwidth of a basic control resource set (CORESET) (e.g., CORESET0) configured by a master information block (MIB) which may be obtained through a PBCH in a synchronization process or may correspond to a bandwidth of an initial BWP configured by system information block 1 (SIB1).

When a terminal receiving broadcast in a RRC idle or inactive mode switches to a connected mode through a RRC setup or RRC resume process, a terminal may perform a RACH process for initial access. For example, through message 3 (MSG3) in a 4-step RACH process or message A (MSGA) in a 2-step RACH process, a terminal may transmit a RRC request or RRC resume request message to a network. Here, a terminal may inform a base station of whether a terminal receives broadcast through MSG3 in a 4-step RACH process or MSGA in a 2-step RACH process as follows:

Method 1 is a method in which an establishment case field of a RRC request or RRC resume request message informs whether broadcast is received.

A terminal may inform a base station of whether broadcast is received through an establishment case field of a RRC request or RRC resume request message. For example, whether a terminal is receiving broadcast may be indicated through a specific reserved value of an establishment case field. In addition, in which BWP or in which CFR or in which frequency a specific reserved value of an establishment case field is received may be indicated.

Method 2 is a method in which a logical channel ID (LCID) field of a MAC PDU header including a RRC request or RRC resume request message informs whether broadcast is received.

A header of a MAC PDU included in a RRC setup request or RRC resume request message may indicate whether broadcast is received. In particular, a specific value of a LCID field of a header may inform whether broadcast is received. In addition, a specific value of a LCID field of a header may indicate in which BWP or in which CFR or in which frequency broadcast is received. Alternatively, a specific value of a LCID field of a header may indicate a G-RNTI which is being received. A corresponding MAC PDU corresponds to MSG3 in a 4-step RACH process or MSGA in a 2-step RACH process.

Alternatively, MSG3 in a 4-step RACH process or MSGA in a 2-step RACH process may include a MAC control element (CE). A specific field of a MAC CE may indicate whether broadcast is received, in which BWP, in which CFR or in which frequency broadcast is being received, a G-RNTI which is being received, etc.

Method 3 is a method in which a RACH preamble ID or a RACH occasion or a UL BWP in a 4-step RACH or 2-step RACH process informs whether broadcast is received.

When a RACH is performed for initial access, a RACH preamble ID or a RACH Occasion or a UL BWP used in partial transmission of a preamble of MSG1 in a 4-step RACH process or MSGA in a 2-step RACH process may inform whether broadcast is received. Alternatively, through a RACH process, in which BWP, in which CFR or in which frequency broadcast is being received, a G-RNTI which is being received, etc. may be indicated.

In the above-described manner, a terminal may report to a base station whether it is receiving broadcast through a RACH. A base station may transmit a RRC setup message or a RRC resume message to a terminal. This RRC setup message or RRC resume message may include broadcast CFR configuration information, and it may also include configuration information for an initial/default BWP supporting a configured broadcast CFR or a first active DL BWP supporting a broadcast CFR. After receiving the RRC setup message or RRC resume message, a terminal may switch to a connected mode. In a connected mode, a terminal may configure an initial/default BWP or a first active DL BWP related to a broadcast CFR according to the configuration information.

Here, an initial BWP related to a broadcast CFR may include a broadcast CFR. Such an initial BWP may be different from an initial BWP configured by a MIB or a SIB, and may be an initial BWP having a bandwidth wider than an initial BWP configured by a MIB or a SIB.

If the RRC setup message or RRC resume message does not include the configuration information, a broadcast CFR configuration may be received from SIB1 or SIBx (x>1) or MCCH message. A terminal which previously received broadcast transmission may continue to maintain these broadcast CFR configurations even after switching to a connected mode. Here, an initial BWP of a connected mode may be configured as follows.

As a first example, a terminal maintains an initial BWP configured according to SIB1 in a connected mode as before, and it may apply a broadcast CFR only when receiving broadcast. Here, if a broadcast CFR includes an initial BWP, a terminal may expand a bandwidth by a broadcast CFR according to a time point when broadcast is received. If a broadcast CFR does not include an initial BWP or SCS is different, a terminal may receive a broadcast CFR by performing BWP switching at a time point when broadcast is received.

As a second example, a terminal separately receives an initial BWP configuration which supports a broadcast CFR from SIBx (x>1) or MCCH message, and it may apply an initial BWP configuration received from SIBx (x>1) or MCCH message in a connected mode. In this case, an initial BWP may be configured to be a broadcast CFR or to include a broadcast CFR. Accordingly, a terminal does not need to expand or switch a bandwidth for broadcast CFR reception.

After a terminal switches to a connected mode, a base station may configure a UE-specific BWP. If a terminal reports broadcast reception, a base station may configure a configured UE specific BWP to include a broadcast CFR. In addition, it also may configure a UE specific BWP to include a multicast CFR together. In this case, a terminal may receive broadcast and multicast transmission through one CFR. Alternatively, a terminal may receive broadcast and multicast transmission through two CFRs (i.e., a broadcast CFR and a multicast CFR).

In group common PDSCH reception, for a limited buffer rate matching (LBRM) operation, a base station may provide a terminal with a resource block configuration, a max MIMO layer configuration, a max modulation order configuration, etc. for a BWP or a CFR. If one CFR supports both broadcast and multicast, a terminal receives both broadcast and multicast according to a resource block configuration, a max MIMO layer configuration, a max modulation order configuration of a broadcast CFR. Alternatively, if one CFR supports both broadcast and multicast, a terminal receives both broadcast and multicast according to a resource block configuration, a max MIMO layer configuration, a max modulation order configuration of a multicast CFR.

If broadcast and multicast transmission are received through two CFRs (i.e., a broadcast CFR and a multicast CFR), broadcast may be received according to a resource block configuration, a max MIMO layer configuration, a max modulation order configuration of a broadcast CFR and multicast may be received according to a resource block configuration, a max MIMO layer configuration, a max modulation order configuration of a multicast CFR.

MBS-Related Timer-Based Operation

An operation such as bandwidth part (BWP) switching, cell inactivation, RRC connection release, etc. in a terminal may be performed based on a timer. For example, when a corresponding timer expires, BWP switching, cell inactivation, RRC connection release, etc. may occur. In such a timer-based operation, it is defined in the existing wireless communication system that a corresponding timer is started or restarted when unicast data for a terminal or scheduling information thereof is received. In other words, since a corresponding timer is not started/restarted even when a terminal receives multicast data or scheduling information thereof, there is a problem that a situation such as BWP switching, cell inactivation, or RRC connection release, etc. may occur while receiving multicast data.

Accordingly, in the present disclosure, examples of a new timer-based operation for BWP switching, cell inactivation, RRC connection release, etc. considering multicast/broadcast reception are described.

Figure 8:
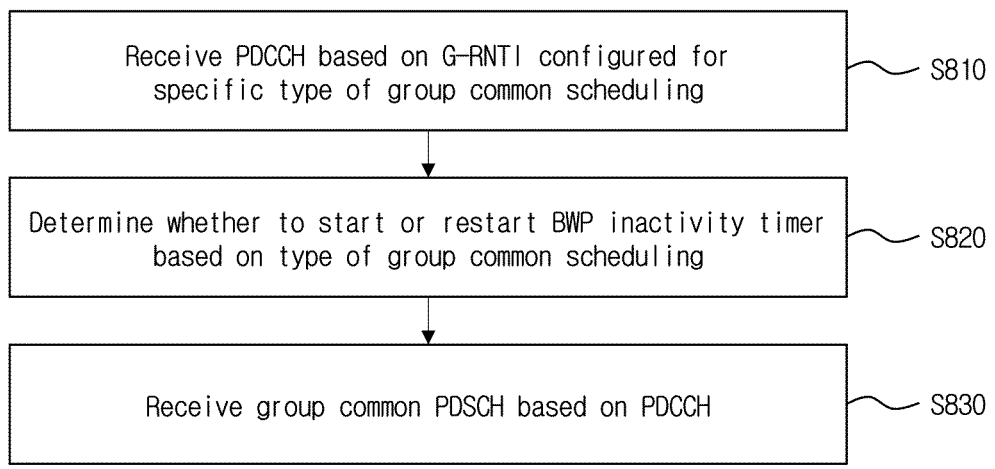
FIG. 8 is a diagram for describing an example of a method in which a terminal receives a downlink channel according to the present disclosure.

FIG. 8 is a diagram for describing an example of a method in which a terminal receives a downlink channel according to the present disclosure.

In S810, a terminal may receive a PDCCH based on a G-RNTI configured for group common scheduling of a specific type.

A G-RNTI may be configured for first type (e.g., multicast type) group common scheduling or may be configured for any one of second type (e.g., broadcast type) group common scheduling.

A PDCCH may correspond to a first type DCI format or a second type DCI format. A first type DCI format may be CRC-scrambled based on a G-RNTI configured for first type group common scheduling, and may schedule a first type group common PDSCH. A second type DCI format may be CRC-scrambled based on a G-RNTI configured for second type group common scheduling, and may schedule a second type group common PDSCH.

In S820, a terminal may determine whether to start or restart a BWP inactivity timer based on a group common scheduling type.

A BWP inactivity timer (e.g., a first inactivity timer) may be started/restarted based on a G-RNTI configured for first type group common scheduling among a first type or a second type. A BWP inactivity timer may not be started or restarted based on a G-RNTI configured for second type group common scheduling among a first type or a second type.

In S830, a terminal may receive a group common PDSCH based on a PDCCH.

Before expiration of a BWP inactivity timer, a group common PDSCH may be received in an active BWP (e.g., a first BWP) that a PDCCH is received.

When a BWP inactivity timer expires, BWP switching may be performed from a first BWP to a second BWP (e.g., an initial or default BWP). For example, when a PDCCH based on a G-RNTI configured for second type group common scheduling is received, a BWP inactivity timer is not started/restarted, so switching to a second BWP may be performed before receiving a PDSCH or while receiving a PDSCH. Alternatively, when a PDCCH based on a G-RNTI configured for first type group common scheduling is received, a BWP inactivity timer is started/restarted, so a PDCCH and a PDSCH may be received on the same first BWP.

Additionally, a MAC PDU may be obtained through decoding of a PDSCH and a MAC SDU may be obtained through processing for a MAC PDU. For a MAC SDU related to first type group common scheduling among a first type or a second type, a data inactivity timer (e.g., a second inactivity timer) distinct from a BWP inactivity timer (e.g., a first inactivity timer) may be started/restarted. For a MAC SDU related to second type group common scheduling among a first type or a second type, a data inactivity timer may not be started/restarted. When a data inactivity timer expires, an action of a terminal related to RRC release (or transition to a RRC idle state) may be performed.

Figure 9:
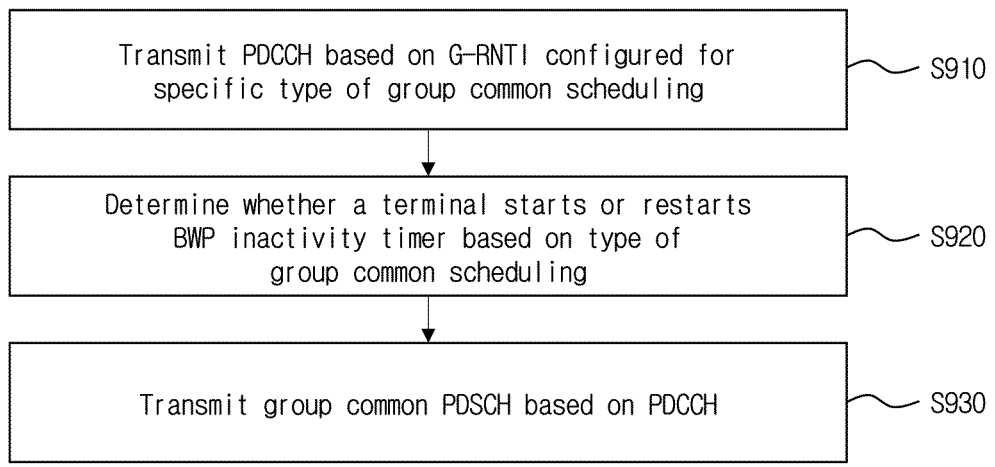
FIG. 9 is a diagram for describing an example of a method in which a base station transmits a downlink channel according to the present disclosure.

FIG. 9 is a diagram for describing an example of a method in which a base station transmits a downlink channel according to the present disclosure.

In S910, a base station may transmit a PDCCH to at least one terminal based on a G-RNTI configured for group common scheduling of a specific type (e.g., a first type or a second type).

In S920, a base station may determine/expect whether a BWP inactivity timer is started/restarted in a terminal based on a type of group common scheduling.

In S930, a base station may transmit a group common PDSCH to at least one terminal based on a PDCCH.

For examples for first type and second type group common scheduling, a BWP inactivity timer and a data inactivity timer in FIG. 9, examples described in FIG. 8 may be equally applied, so an overlapping description is omitted.

In reference to FIGS. 8 and 9, an example that an inactivity timer-based operation varies according to a group common scheduling type (e.g., a multicast type or a broadcast type) is described. For example, BWP switching may not be performed (i.e., an active BWP may be maintained) before a BWP-inactivity timer starts/restarts and expires (i.e., while running). RRC release (or transition to a RRC idle state) may not be performed (i.e., a RRC connected state may be maintained) before a data-inactivity timer starts/restarts and expires (i.e., while running). Here, an inactivity timer starts/restarts for a first type of group common scheduling, but an inactivity timer may not start/restart for a second type of group common scheduling.

A variety of examples including the above-described contents which may be applied to an example of FIGS. 8 and 9 are described below. Some of examples described below may be additionally or alternatively applied to an example of FIGS. 8 and 9.

Embodiment 1

This embodiment relates to a BWP-inactivity timer (BWP-InactivityTimer) based operation of a terminal receiving group common transmission.

A plurality of BWPs (e.g., up to 4 BWPs in the existing wireless communication system) may be configured for a terminal in a RRC connected mode. Among a plurality of configured BWPs, only one BWP may be activated at a specific time point. In other words, simultaneous activation of a plurality of BWPs may not be supported yet. When a BWP-inactivity timer (BWP-InactivityTimer) expires, a currently activated BWP may be inactivated and BWP switching may be performed. A destination of BWP switching may be a default BWP if a default BWP is configured for a terminal and it may be an initial BWP if there is no default BWP configuration.

According to the previously defined terminal operation, when a terminal receives a PDCCH (e.g., corresponding to a DCI format which is CRC-scrambled with a C-RNTI/a CS-RNTI) indicating UE-specific scheduling (e.g., unicast scheduling), BWP-InactivityTimer is started/restarted. In other words, in this case, in order to prevent BWP inactivation/switching, a corresponding timer may start/restart so that BWP-InactivityTimer is not expired. But, when a terminal receives a PDCCH (e.g., corresponding to a DCI format which is CRC-scrambled with a G-RNTI) indicating group common scheduling such as multicast/broadcast, whether to start/restart BWP-InactivityTimer is not defined.

Embodiment 1-1

BWP-InactivityTimer may be started or restarted in DCI reception for a specific G-RNTI or a specific cast type (e.g., a multicast type or a broadcast type). BWP-InactivityTimer may not be started or restarted in DCI reception for a G-RNTI or a cast type other than the specific cast type.

For example, when a multicast type PDSCH is received, a terminal receiving scheduling for a multicast type PDSCH may start or restart BWP-InactivityTimer. On the other hand, when a broadcast type PDSCH is received, a terminal receiving scheduling for a broadcast type PDSCH may not start or restart BWP-InactivityTimer. In other words, when a PDCCH of DCI which is CRC-scrambled with a specific G-RNTI like a multicast G-RNTI is received, BWP-InactivityTimer may be started or restarted, and when a PDCCH of DCI which is CRC-scrambled with a specific G-RNTI like a broadcast G-RNTI is received, BWP-InactivityTimer may not be started or restarted.

As another example, if a CFR is not configured set in a default BWP or an initial BWP or if a G-RNTI to be received is not provided, BWP-InactivityTimer may not be started/restarted regardless of a group common scheduling type. For example, when a CFR is not configured in a default/initial BWP, a destination BWP of BWP switching due to expiration of BWP-InactivityTimer, or when a G-RNTI of a type to be received is not provided, a terminal may not start/restart BWP-InactivityTimer when a PDCCH is received for both a broadcast type and a multicast type in a current active BWP.

In addition, when a PDCCH of DCI scheduling PTP retransmission for both broadcast and multicast is received, BWP-InactivityTimer may not be started/restarted. DCI scheduling PTP retransmission for PTM transmission may be CRC-scrambled with a C-RNTI or a CS-RNTI, and PTP retransmission for a TB transmitted by PTM may be scheduled.

As another example, if a broadcast CFR is not configured in a default BWP or an initial BWP, or if a G-RNTI to be received is not provided, BWP-InactivityTimer may not be started/restarted when a PDCCH of group common DCI for broadcast is received in a current active BWP.

In addition, when a PDCCH of DCI scheduling PTP retransmission for broadcast is received, BWP-Inactivity-Timer may not be started/restarted. Here, DCI may be CRC-scrambled with a C-RNTI or a CS-RNTI, and may schedule PTP retransmission for a TB transmitted by broadcast PTM.

As another example, if a multicast CFR is not configured in a default BWP or an initial BWP, or if a G-RNTI to be received is not provided, BWP-InactivityTimer may not be started/restarted when a PDCCH of group common DCI for multicast is received in a current active BWP.

In addition, when a PDCCH of DCI scheduling PTP retransmission for multicast is received, BWP-Inactivity-Timer may not be started/restarted. Here, DCI may be CRC-scrambled with a C-RNTI or a CS-RNTI, and may schedule PTP retransmission for a TB transmitted by multicast PTM.

Embodiment 1-2

This embodiment relates to a method in which BWP-InactivityTimer is not configured for a terminal receiving multicast or broadcast transmission.

For example, a base station may not configure BWP-InactivityTimer for a terminal reporting an interest indication.

Alternatively, although a base station configures BWP-InactivityTimer, when a CFR is configured in a current active BWP, a terminal may not start or restart BWP-InactivityTimer and may not perform BWP switching according to BWP-InactivityTimer. In addition, currently running BWP-InactivityTimer may be stopped.

Alternatively, although a base station configures BWP-InactivityTimer, when broadcast transmission or multicast transmission is received in a current active BWP, a terminal may not start or restart BWP-InactivityTimer and may not perform BWP switching according to BWP-InactivityTimer. In addition, currently running BWP-InactivityTimer may be stopped.

Embodiment 1-3

For example, although BWP-InactivityTimer expires, when DCI received in a current active BWP schedules group common PDSCH transmission, BWP switching may be performed after group common PDSCH reception or immediately after HARQ-ACK transmission for group common PDSCH reception.

For example, when DCI received in a current active BWP schedules group common PDSCH transmission, after group common PDSCH reception or until HARQ-ACK for group common PDSCH reception is transmitted, BWP switching may not be performed although BWP-InactivityTimer expires.

Embodiment 1-4

In this embodiment, if a CFR is not configured in a default BWP or an initial BWP, or if a G-RNTI to be received is not provided, although BWP-InactivityTimer is configured, a terminal may not start/restart BWP-Inactivity Timer regardless of what PDCCH is received in a current active BWP. In addition, currently running BWP-InactivityTimer may be stopped.

For example, if there is a MBS configuration in a current active BWP and there is no MBS configuration in a default/initial BWP, a terminal may not operate BWP-Inactivity-Timer.

For example, if there is no MBS configuration in a current active BWP and there is no MBS configuration in a default/initial BWP, a terminal may operate BWP-InactivityTimer according to PDCCH reception of a current active BWP.

For example, if there is a MBS configuration in a current active BWP and there is a MBS configuration in a default/initial BWP, a terminal may operate BWP-InactivityTimer according to PDCCH reception of a current active BWP. Alternatively, if there is a MBS configuration in a current active BWP, a terminal may not operate BWP-Inactivity-Timer although there is a MBS configuration in a default/initial BWP. In other words, if there is a MBS configuration in a current active BWP, BWP-InactivityTimer may not be operated regardless of a MBS configuration of a default/initial BWP.

In this embodiment, a MBS configuration may include a CFR configuration, a G-RNTI-related configuration to be received, a multicast reception-related configuration, or a broadcast reception-related configuration, etc.

Not operating BWP-InactivityTimer may include not starting/restarting a timer according to PDCCH reception of DCI which is CRC-scrambled with a C-RNTI, a CS-RNTI, a G-RNTI, a G-CS-RNTI, etc. In addition, since a timer value is not expired unless BWP-InactivityTimer is operated, BWP inactivation and switching according to timer expiration may not be performed.

Embodiment 2

This embodiment relates to a method in which a terminal starts to receive group common transmission after BWP switching.

For example, when BWP-InactivityTimer expires and a terminal switches to a default BWP or an initial BWP, a terminal may automatically start GC (group common)-PDCCH monitoring in a default BWP or an initial BWP (without a separate configuration/indication).

As another example, when a base station configures/indicates GC-PDCCH monitoring through a RRC message, a MAC CE or DCI, a terminal may start GC-PDCCH monitoring in a default BWP or an initial BWP. Here, a terminal may receive DCI on a default BWP or an initial BWP. For example, a base station may configure whether a specific terminal immediately starts GC-PDCCH monitoring in a CFR connected to a destination BWP in BWP switching through a RRC message, a MAC CE, or DCI. Whether to immediately start GC-PDCCH monitoring after BWP switching may be configured/indicated per switching destination BWP or CFR or may be configured/indicated per serving cell. When a terminal switches to a BWP, a CFR or a serving cell which is not configured to immediately start GC-PDCCH monitoring after BWP switching, a base station may separately configure/indicate whether GC-PDCCH monitoring is performed through a RRC message, a MAC CE or DCI.

When a terminal switches to BWP #2 according to DCI received from BWP #1, a base station may configure/indicate to a terminal whether to monitor a GC-PDCCH on a CFR connected to BWP #2 while indicating BWP ID=#2 through DCI or activate a connected CFR.

In this case, when DCI received from BWP #1 gives an indication to monitor a GC-PDCCH or activate a connected CFR, a terminal may activate a CFR connected to BWP #2 after switching to BWP #2 and monitor a GC-PDCCH.

If DCI received from BWP #1 gives an indication not to monitor a GC-PDCCH or does not give an indication to activate a connected CFR, a terminal may inactivate a CFR connected to BWP #2 after switching to BWP #2 and may not monitor a GD-PDCCH. Alternatively, when DCI gives an indication to stop GC-PDCCH monitoring or inactivate a connected CFR, a terminal may inactivate a CFR connected to BWP #2 after switching to BWP #2 and may not monitor a GD-PDCCH.

When DCI received from BWP #2 indicates GC-PDCCH monitoring or indicates connected CFR activation while indicating BWP ID=#2, a terminal may activate a CFR connected to BWP #2 and monitor a GC-PDCCH Embodiment 3

This embodiment relates to a PTP transmission method after BWP switching.

A base station may configure a split MBS bearer in a different BWP belonging to the same serving cell. For example, one split MBS bearer may be a group common PTM-based bearer belonging to BWP #1 and the other split MBS bearer may be a terminal-dedicated PTP-based bearer belonging to BWP #2. If BWP-InactivityTimer expires and switches from a certain BWP to a default BWP or an initial BWP, a terminal may activate a PTP-based bearer or a PTM-based bearer mapped to a default BWP or an initial BWP. Here, an activated PTP-based bearer or PTM-based bearer may belong to the same split bearer as a bearer mapped to a BWP before switching. In addition, a terminal may inactivate a bearer mapped to a BWP before switching belonging to the same split bearer.

As another example, when BWP-InactivityTimer expires and switches from a certain BWP to a default BWP or an initial BWP, a terminal may immediately start PDCCH monitoring for PTP initial transmission or retransmission. A base station may configure whether to immediately start PDCCH monitoring for PTP (re)transmission in a CFR connected to a destination BWP when a specific terminal performs BWP switching through a RRC message, a MAC CE, or DCI. Whether to immediately start PDCCH monitoring for PTP (re)transmission after BWP switching may be configured/indicated per switching destination BWP or CFR, or may be configured/indicated per serving cell. When a terminal switches to a BWP, a CFR, or a serving cell which is not configured to immediately start PDCCH monitoring for PTP (re)transmission after BWP switching, a base station may separately configure/indicate whether PDCCH monitoring for PTP (re)transmission is performed through a RRC message, a MAC CE, or DCI.

In this case, when a TB received in a BWP before switching is retransmitted, a base station may schedule the same HARQ process ID for TB transmission in a BWP before switching and TB retransmission in a BWP after switching (e.g., a default BWP or an initial BWP). In other words, for the same G-RNTI, a value of a HARQ process number (HPN) field of DCI for TB transmission in a BWP before switching may be the same as a value of a HPN field of DCI for TB retransmission in a BWP after switching.

Embodiment 4

This embodiment relates to an operation based on a CFR inactivity timer separate from BWP-InactivityTimer.

A base station and a terminal may configure CFR-InactivityTimer separately from BWP-InactivityTimer. A terminal may start or restart CFR-InactivityTimer in DCI reception for a G-RNTI or a G-CS-RNTI. Alternatively, CFR-InactivityTimer may be started or restarted in DCI reception for a specific cast type (e.g., first type group common scheduling) or a specific G-RNTI and CFR-InactivityTimer may not be started/restarted in DCI reception for other cast type (e.g., second type group common scheduling) or other G-RNTI.

When CFR-InactivityTimer of a CFR connected to a current active BWP expires, a terminal may switch to a CFR connected to a default BWP or an initial BWP.

Alternatively, although CFR-InactivityTimer of a CFR connected to an active BWP expires, if BWP-InactivityTimer for an active BWP does not expire, a terminal may not switch to a CFR connected to a default BWP or an initial BWP. In other words, only when both CFR-InactivityTimer of a CFR connected to an active BWP and BWP-InactivityTimer for an active BWP expire, a terminal may switch to a CFR connected to a dfault default BWP or an initial BWP. In addition, when both CFR-InactivityTimer of a CFR connected to an active BWP and BWP-InactivityTimer for an active BWP expire, a terminal may switch to a default BWP or an initial BWP.

Furthermore, when CFR-InactivityTimer or BWP-InactivityTimer is started or restarted according to PDCCH reception, a terminal may not switch to a CFR connected to a dfault default BWP or an initial BWP. In addition, when CFR-InactivityTimer or BWP-InactivityTimer is started or restarted according to PDCCH reception, a terminal may not switch to a default BWP or an initial BWP.

Alternatively, although only one timer of CFR-InactivityTimer of a CFR connected to an active BWP and BWP-InactivityTimer for an active BWP expires, a terminal may switch to a CFR connected to a dfault default BWP or an initial BWP. In addition, although only one timer of CFR-InactivityTimer of a CFR connected to an active BWP and BWP-InactivityTimer for an active BWP expires, a terminal may switch to a default BWP or an initial BWP.

Embodiment 5

This embodiment relates to an operation of a MAC entity (or layer) related to BWP switching. An underlined part in a table below may correspond to a MAC entity operation which may be changed according to the present disclosure based on an operation of the existing MAC entity.

TABLE 6

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure or upon detection of consistent LBT failure on SpCell. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL.

TABLE 6-continued

For each SCell a dormant BWP may be configured with dormantBWP-Id by RRC signalling. Entering or leaving dormant BWP for SCells is done by BWP switching per SCell or per dormancy SCell group based on instruction from PDCCH. The dormancy SCell group configurations are configured by RRC signalling. Upon reception of the PDCCH indicating leaving dormant BWP, the DL BWP indicated by firstOutsideActiveTimeBWP-Id or by firstWithinActiveTimeBWP-Id is activated. Upon reception of the PDCCH indicating entering dormant BWP, the DL BWP indicated by dormantBWP-Id is activated. The dormant BWP configuration for SpCell or PUCCH SCell is not supported.
        For each activated Serving Cell configured with a BWP, the MAC entity shall:
1>     if a BWP is activated and the active DL BWP for the Serving Cell is not the dormant BWP:
2>        transmit on UL-SCH on the BWP;
2>        transmit on RACH on the BWP, if PRACH occasions are configured;
2>        monitor the PDCCH on the BWP;
2>        <u>monitor the GC-PDCCH on CFR associated with the BWP;</u>
2>        transmit PUCCH on the BWP, if configured;
2>        report CSI for the BWP;
2>        transmit SRS on the BWP, if configured;
2>        receive DL-SCH on the BWP <u>and CFR associated with the BWP;</u>
2>        <u>receive GC-PDSCH on CFR associated with the BWP;</u>
2>        (re-)initialize any suspended configured uplink grants of configured grant Type 1 on the active BWP according to the stored configuration, if any, and to start in the symbol according to specific rules;
2>        if lbt-FailureRecoveryConfig is configured:
3>        stop the lbt-FailureDetectionTimer, if running;
3>        set LBT_COUNTER to 0;
3>        monitor LBT failure indications from lower layers.
1>     if a BWP is activated and the active DL BWP for the Serving Cell is dormant BWP:
2>        stop the bwp-InactivityTimer of this Serving Cell, if running.
2>        <u>stop the CFR-InactivityTimer of this Serving Cell, if running.</u>
2>        not monitor the PDCCH on the BWP;
2>        not monitor the PDCCH for the BWP;
2>        <u>not monitor the GC-PDCCH on CFR associated with the BWP;</u>
2>        not receive DL-SCH on the BWP <u>and CFR associated with the BWP;</u>
2>        <u>not receive GC-PDSCH on CFR associated with the BWP;</u>
2>        not report CSI on the BWP, report CSI except aperiodic CSI for the BWP;
2>        not transmit SRS on the BWP;
2>        not transmit on UL-SCH on the BWP;
2>        not transmit on RACH on the BWP;
2>        not transmit PUCCH on the BWP;
2>        clear any configured downlink assignment and any configured uplink grant Type 2 associated with the SCell respectively;
2>        <u>clear any configured downlink assignment (i.e. group common SPS resources) on the CFR associated with the SCell respectively;</u>
2>        suspend any configured uplink grant Type 1 associated with the SCell;
2>        if configured, perform beam failure detection and beam failure recovery for the SCell if beam failure is detected.
1>     if a BWP is deactivated:
2>        not transmit on UL-SCH on the BWP;
2>        not transmit on RACH on the BWP;
2>        not monitor the PDCCH on the BWP;
2>        <u>not monitor the GC-PDCCH on CFR associated with the BWP;</u>
2>        not transmit PUCCH on the BWP;
2>        not report CSI for the BWP;
2>        not transmit SRS on the BWP;
2>        not receive DL-SCH on the BWP <u>and CFR associated with the BWP;</u>
2>        <u>not receive GC-PDSCH on CFR associated with the BWP;</u>
2>        clear any configured downlink assignment and configured uplink grant of configured grant Type 2 on the BWP;
2>        <u>clear any configured downlink assignment (i.e. group common SPS resources) on the CFR associated with the BWP;</u>
2>        suspend any configured uplink grant of configured grant Type 1 on the inactive BWP.
Upon initiation of the Random Access procedure on a Serving Cell, after the selection of carrier for performing Random Access procedure, the MAC entity shall for the selected carrier of this Serving Cell:
1>     if PRACH occasions are not configured for the active UL BWP:
2>        switch the active UL BWP to BWP indicated by initialUplinkBWP;
2>        if the Serving Cell is an SpCell:
3>        switch the active DL BWP to BWP indicated by initialDownlinkBWP.
3>        <u>switch the CFR associated with the active DL BWP to the CFR associated with BWP indicated by initialDownlinkBWP.</u>
1>     else:
2>        if the Serving Cell is an SpCell:
3>        if the active DL BWP does not have the same bwp-Id as the active UL BWP:
4>        switch the active DL BWP to the DL BWP with the same bwp-Id as the active UL BWP.

TABLE 6-continued

| | |
|---|---|
| 4> | switch the CFR associated with the active DL BWP to the CFR associated with the DL BWP with the same bwp-Id as the active UL BWP. |
| 1> | stop the bwp-InactivityTimer associated with the active DL BWP of this Serving Cell, if running. |
| 1> | stop the CFR-InactivityTimer associated with the CFR associated with the active DL BWP of this Serving Cell, if running. |
| 1> | if the Serving Cell is SCell: |
| 2> | stop the bwp-InactivityTimer associated with the active DL BWP of SpCell, if running. |
| 2> | stop the CFR-InactivityTimer associated with the CFR associated with the active DL BWP of SpCell, if running. |
| 1> | perform the Random Access procedure on the active DL BWP of SpCell and active UL BWP of this Serving Cell. |

If the MAC entity receives a PDCCH for BWP switching of a Serving Cell, the MAC entity shall:

| | |
|---|---|
| 1> | if there is no ongoing Random Access procedure associated with this Serving Cell; or |
| 1> | if the ongoing Random Access procedure associated with this Serving Cell is successfully completed upon reception of this PDCCH addressed to C-RNTI: |
| 2> | cancel, if any, triggered consistent LBT failure for this Serving Cell; |
| 2> | perform BWP switching to a BWP indicated by the PDCCH. |
| 2> | perform switching to the CFR associated with the BWP indicated by the PDCCH. |

If the MAC entity receives a PDCCH for BWP switching for a Serving Cell(s) or a dormancy SCell group(s) while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell.
Upon reception of RRC (re-)configuration for BWP switching for a Serving Cell while a Random Access procedure associated with that Serving Cell is ongoing in the MAC entity, the MAC entity shall stop the ongoing Random Access procedure and initiate a Random Access procedure after performing the BWP switching.
Upon reception of RRC (re-)configuration for BWP switching for a Serving Cell, cancel any triggered LBT failure in this Serving Cell.
The MAC entity shall for each activated Serving Cell configured with bwp-InactivityTimer:

| | |
|---|---|
| 1> | if the defaultDownlinkBWP-Id is configured, and the active DL BWP is not the BWP indicated by the defaultDownlinkBWP-Id, and the active DL BWP is not the BWP indicated by the dormantBWP-Id if configured; or |
| 1> | if the defaultDownlinkBWP-Id is not configured, and the active DL BWP is not the initialDownlinkBWP, and the active DL BWP is not the BWP indicated by the dormantBWP-Id if configured: |
| 2> | if a PDCCH addressed to C-RNTI or CS-RNTI indicating downlink assignment or uplink grant is received on the active BWP; or |
| 2> | if a PDCCH addressed to C-RNTI or CS-RNTI indicating downlink assignment or uplink grant is received for the active BWP; or |
| 2> | if a PDCCH addressed to G-RNTI or G-CS-RNTI indicating downlink assignment for multicast or broadcast is received on the CFR associated with the active BWP or for the CFR associated with the active BWP; or |
| 2> | if a MAC PDU is transmitted in a configured uplink grant and LBT failure indication is not received from lower layers; or |
| 2> | if a MAC PDU is received in a configured downlink assignment: |
| 3> | if there is no ongoing Random Access procedure associated with this Serving Cell; or |
| 3> | if the ongoing Random Access procedure associated with this Serving Cell is successfully completed upon reception of this PDCCH addressed to C-RNTI: |
| 4> | start or restart the bwp-InactivityTimer associated with the active DL BWP. |
| 4> | start or restart the CFR-InactivityTimer associated with the CFR associated with the active DL BWP. |
| 2> | if the bwp-InactivityTimer associated with the active DL BWP expires: |
| 3> | if the defaultDownlinkBWP-Id is configured: |
| 4> | perform BWP switching to a BWP indicated by the defaultDownlinkBWP-Id. |
| 4> | perform switching to the CFR associated with the BWP indicated by the defaultDownlinkBWP-Id. |
| 3> | else: |
| 4> | perform BWP switching to the initialDownlinkBWP |
| 4> | perform switching to the CFR associated with the initialDownlinkBWP. |

NOTE: If a Random Access procedure is initiated on an SCell, both this SCell and the SpCell are associated with this Random Access procedure.

| | |
|---|---|
| 1> | if a PDCCH for BWP switching is received, and the MAC entity switches the active DL BWP and the CFR associated with the active DL BWP: |
| 2> | if the defaultDownlinkBWP-Id is configured, and the MAC entity switches to the DL BWP which is not indicated by the defaultDownlinkBWP-Id and is not indicated by the dormantBWP-Id if configured; or |

TABLE 6-continued

2> if the defaultDownlinkBWP-Id is not configured, and the MAC entity switches to the DL BWP which is not the initialDownlinkBWP and is not indicated by the dormantBWP-Id if configured:
3> start or restart the bwp-InactivityTimer associated with the active DL BWP.
3> start or restart the CFR-InactivityTimer associated with the CFR associated with the active DL BWP.

In an example of Table 6, for each activated serving cell that a BWP is configured, a MAC entity of a terminal performs the following operation:—When a BWP is activated and a DL BWP activated for a serving cell is not a dormant BWP, a GC-PDCCH is monitored on a CFR associated with a BWP; a DL-SCH is received on a CFR associated with a BWP and a BWP; or a GC-PDSCH is received on a CFR associated with a BWP.

When a BWP is activated and a DL BWP activated for a serving cell is a dormant BWP, if in operation, CFR-InactivityTimer of a corresponding serving cell is stopped, a GC-PDCCH is not monitored on a CFR associated with a BWP, a DL-SCH is not received on a CFR associated with a BWP and a BWP; or a GC-PDSCH is not received on a CFR associated with a BWP; or if there is downlink allocation (i.e., group common SPS resource) configured on a CFR associated with a SCell, all are cleared.

When a BWP is inactivated, a GC-PDCCH is not monitored on a CFR associated with a BWP, or a DL-SCH is not received on a CFR associated with a BWP and a BWP; a GC-PDSCH is not received on a CFR associated with a BWP; or if there is downlink allocation (i.e., group common SPS resource) configured on a CFR associated with a SCell, all are cleared.

When a random access process is initiated on a serving cell, after selecting a carrier which will perform a random access process, a MAC entity performs the following operation for a selected carrier of a corresponding serving cell:

When a PRACH occasion is not configured for an active UL BWP: When a serving cell is a SpCell (e.g., a PCell or a PSCell): A CFR associated with an active DL BWP is switched to a CFR associated with an initial DL BWP (e.g., a BWP indicated by an initialDownlinkBWP parameter).

When a PRACH occasion is configured for an active UL BWP: When a serving cell is a SpCell: When an active DL BWP does not have the same BWP identification information (e.g., bwp-Id) as an active UL BWP: A CFR associated with an active DL BWP is switched to a CFR associated with a DL BWP having the same BWP identification information as an active UL BWP.

If in operation, CFR-InactivityTimer associated with a CFR associated with an active DL BWP of a corresponding serving cell is stopped.

When a serving cell is a SCell: If in operation, CFR-InactivityTimer associated with a CFR associated with an active DL BWP of a SpCell is stopped.

When a MAC entity receives a PDCCH for BWP switching of a serving cell, a MAC entity performs the following operation:

When an ongoing random access process associated with a corresponding serving cell is successfully completed according to reception of a corresponding PDCCH addressed to a C-RNTI: Switching is performed to a CFR associated with a BWP indicated by a corresponding PDCCH.

For each activated serving cell that bwp-InactivityTimer is configured, a MAC entity performs the following operation:

When default DL BWP identification information (e.g., defaultDownlinkBWP-Id) is configured, an active DL BWP is not a BWP indicated by default DL BWP identification information, and an active DL BWP (if configured) is not a BWP indicated by dormant BWP identification information (e.g., dormantBWP-Id): Alternatively, when default DL BWP identification information is not configured, an active DL BWP is not an initial DL BWP, and an active DL BWP (if configured) is not a BWP indicated by doment BWP identification information:

When a PDCCH addressed to a G-RNTI or a G-CS-RNTI indicating downlink allocation for multicast is received on a CFR associated with an active BWP or is received for a CFR associated with an active BWP: When there is no ongoing random access process associated with a corresponding serving cell, or when an ongoing random access process associated with a corresponding serving cell is successfully completed according to reception of a corresponding PDCCH addressed to a C-RNTI: CFR-InactivityTimer associated with a CFR associated with an active DL BWP is started or restarted.

When a PDCCH addressed to a G-RNTI or a G-CS-RNTI indicating downlink allocation for multicast/broadcast is received on a CFR associated with an active BWP or is received for a CFR associated with an active BWP: When there is no ongoing random access process associated with a corresponding serving cell, or when an ongoing random access process associated with a corresponding serving cell is successfully completed according to reception of a corresponding PDCCH addressed to a C-RNTI: CFR-InactivityTimer associated with a CFR associated with an active DL BWP is started or restarted.

When bwp-InactivityTimer associated with an active DL BWP expires: When default DL BWP identification information is configured, BWP switching is performed to a BWP indicated by default DL BWP identification information and switching is performed to a CFR associated with a BWP indicated by default DL BWP identification information.

When bwp-InactivityTimer associated with an active DL BWP expires: When default DL BWP identification information is not configured, BWP switching is performed to an initial DL BWP and switching is performed to a CFR associated with an initial DL BWP.

When a PDCCH for BWP switching is received and a MAC entity switches an active DL BWP and a CFR associated with an active DL BWP: If default DL BWP identification information (e.g., defaultDownlinkBWP-Id) is configured, an active DL BWP is not a BWP indicated by default DL BWP identification information, and an active DL BWP (if configured) is not a BWP indicated by dormant BWP identification information (e.g., dormantBWP-Id): Alternatively, when default DL BWP identification information is not configured, an active DL BWP is not an initial DL BWP, and an active DL BWP (if configured) is not a BWP indicated by dormant BWP identification information: bwp-InactivityTimer associated with an active DL BWP is started or restarted and CFR-InactivityTimer associated with a CFR associated with an active DL BWP is started or restarted.

Embodiment 6

This embodiment relates to a SCell deactivation timer (e.g., sCellDeactivationTimer) based operation of a terminal receiving group common transmission.

When sCellDeactivationTimer for a certain SCell expires, a terminal may deactivate all CFR(s) related to a corresponding SCell and stop CFR-InactivityTimer of a CFR related to a corresponding SCell.

In addition, when sCellDeactivationTimer for a certain SCell expires, a terminal may release or deactivate all group common SPS resources of a CFR related to a corresponding SCell.

When a terminal receives DCI which is CRC-scrambled with a specific G-RNTI or a specific G-CS-RNTI in a certain SCell, or when received DCI schedules a group common PDSCH, or when PTP retransmission for multicast/broadcast transmission (or only for a specific type of cast) is received, a terminal may start or restart sCellDeactivationTimer for corresponding SCell.

Here, a specific G-RNTI or a specific G-CS-RNTI may be configured by a base station. Alternatively, a specific G-RNTI or a specific G-CS-RNTI may be a G-RNTI or a G-CS-RNTI for multicast (not broadcast). If DCI which is CRC-scrambled with other G-RNTI or other G-CS-RNTI, not a specific G-RNTI or a specific G-CS-RNTI, is received, a terminal may not start or restart sCellDeactivationTimer for a corresponding SCell. For example, when DCI which is CRC-scrambled with a G-RNTI or a G-CS-RNTI for broadcast, a terminal may not start or restart sCellDeactivationTimer for a corresponding SCell.

In this embodiment, it is described by assuming a SCell, but a term SCell may be replaced with a term PCell, PSCell, or serving cell. An underlined part in a table below may correspond to a MAC entity operation which may be changed according to the present disclosure based on an operation of the existing MAC entity.

TABLE 7

If the MAC entity is configured with one or more SCells, the network may activate and deactivate the configured SCells. Upon configuration of an SCell, the SCell is deactivated unless the parameter sCellState is set to activated for the SCell by upper layers.
    The configured SCell(s) is activated and deactivated by:
-    receiving the SCell Activation/Deactivation MAC CE;
-    configuring sCellDeactivationTimer timer per configured SCell (except the SCell configured with PUCCH, if any): the associated SCell is deactivated upon its expiry;
-    configuring sCellState per configured SCell: if configured, the associated SCell is activated upon SCell configuration.
The MAC entity shall for each configured SCell:
1>    if an SCell is configured with sCellState set to activated upon SCell configuration, or an SCell Activation/Deactivation MAC CE is received activating the SCell:
2>    if the SCell was deactivated prior to receiving this SCell Activation/Deactivation MAC CE; or
2>    if the SCell is configured with sCellState set to activated upon SCell configuration:
3>    if firstActiveDownlinkBWP-Id is not set to dormant BWP:
4>    activate the SCell according to the timing for MAC CE activation and according to the timing for direct SCell activation; i.e. apply normal SCell operation including:
5>    SRS transmissions on the SCell;
5>    CSI reporting for the SCell;
5>    PDCCH monitoring on the SCell;
5>    PDCCH monitoring for the SCell;
<u>5>    GC-PDCCH monitoring on the CFR associated with the SCell;</u>
<u>5>    GC-PDCCH monitoring for the CFR associated with the SCell;</u>
5>    PUCCH transmissions on the SCell, if configured.
3>    else (i.e. firstActiveDownlinkBWP-Id is set to dormant BWP):
4>    stop the bwp-InactivityTimer of this Serving Cell, if running.
<u>4>    stop the CFR-InactivityTimer of this Serving Cell, if running.</u>
3>    activate the DL BWP and UL BWP indicated by firstActiveDownlinkBWP-Id and firstActive UplinkBWP-Id respectively.
<u>3>    activate the CFR associated with the DL BWP indicated by firstActiveDownlinkBWP-Id.</u>
2>    start or restart the sCellDeactivationTimer associated with the SCell according to the timing for MAC CE activation and according to the timing for direct SCell activation;
2>    if the active DL BWP is not the dormant BWP:
3>    (re-)initialize any suspended configured uplink grants of configured grant Type 1 associated with this SCell according to the stored configuration, if any, and to start in the symbol;
3>    trigger PHR.
1>    else if an SCell Activation/Deactivation MAC CE is received deactivating the SCell; or
1>    if the sCellDeactivationTimer associated with the activated SCell expires:
2>    deactivate the SCell according to the timing;
2>    stop the sCellDeactivationTimer associated with the SCell;
2>    stop the bwp-InactivityTimer associated with the SCell;
<u>2>    stop the CFR-InactivityTimer associated with the CFR associated with the SCell;</u>
2>    deactivate any active BWP associated with the SCell;
<u>2>    deactivate any CFR associated with any active BWP associated with the SCell;</u>

TABLE 7-continued

2> clear any configured downlink assignment and any configured uplink grant Type 2 associated with the SCell respectively;
2> clear any configured downlink assignment (i.e. any group common SPS resource) on any CFR associated with the SCell respectively;
2> clear any PUSCH resource for semi-persistent CSI reporting associated with the SCell;
2> suspend any configured uplink grant Type 1 associated with the SCell;
2> flush all HARQ buffers associated with the SCell;
2> cancel, if any, triggered consistent LBT failure for the SCell.
1> if PDCCH on the activated SCell indicates an uplink grant or downlink assignment; or
1> if PDCCH on the Serving Cell scheduling the activated SCell indicates an uplink grant or a downlink assignment for the activated SCell; or
1> if PDCCH on the activated SCell indicates an group common PDSCH resource (i.e. group common downlink assignment); or
1> if a MAC PDU is transmitted in a configured uplink grant and LBT failure indication is not received from lower layers; or
1> if a MAC PDU is received in a configured downlink assignment:
1> if a MAC PDU is received in a group common SPS PDSCH:
2> restart the sCellDeactivationTimer associated with the SCell.
1> if the SCell is deactivated:
2> not transmit SRS on the SCell;
2> not report CSI for the SCell;
2> not transmit on UL-SCH on the SCell;
2> not transmit on RACH on the SCell;
2> not monitor the PDCCH on the SCell;
2> not monitor the PDCCH for the SCell;
2> not transmit PUCCH on the SCell.
HARQ feedback for the MAC PDU containing SCell Activation/Deactivation MAC CE shall not be impacted by PCell, PSCell and PUCCH SCell interruptions due to SCell activation/deactivation.
When SCell is deactivated, the ongoing Random Access procedure on the SCell, if any, is aborted.

For each of SCells configured in an example of Table 7, a MAC entity of a terminal performs the following operation:—When a SCell is configured by a sCellState parameter to be in an active state or a SCell activation/deactivation MAC CE indicating SCell activation is received: When a corresponding SCell is deactivated before SCell activation/deactivation MAC CE reception, or a sCellState parameter is configured to be in an activation state on a SCell configuration:

If first active DL BWP identification information (e.g., firstActiveDownlinkBWP-Id) is not configured as a dormant BWP: In activating a SCell (i.e., applying a normal SCell operation) according to a MAC CE activation timing and a direct SCell activation timing, the following operation is included and performed: A GC-PDCCH is monitored on a CFR associated with a SCell; or a GC-PDCCH is monitored for a CFR associated with a SCell.

When first active DL BWP identification information is configured as a doment BWP: If in operation, bwp-InactivityTimer of a corresponding serving cell is stopped, or if in operation, CFR-InactivityTimer of a corresponding serving cell is stopped.

A CFR associated with a DL BWP indicated by first active DL BWP identification information is activated.

When a SCell activation/deactivation MAC CE indicating SCell deactivation is received; or when sCellDeactivationTimer associated with an activated SCell expires: CFR-InactivityTimer associated with a CFR associated with a corresponding SCell is stopped; if there is a CFR associated with an active BWP associated with a corresponding SCell, all are deactivated; or if there is a CFR associated with a corresponding SCell, all downlink allocation configured on a corresponding CFR (i.e., all if there is a group common SPS resource) is cleared.

When a PDCCH indicates a group common PDSCH resource (i.e., group common downlink allocation) on an activated SCell; or when a MAC PDU is received in a group common SPS PDSCH; sCellDeactivationTimer associated with a corresponding SCell is restarted.

Embodiment 7

This embodiment relates to a data inactivity timer (e.g., dataInactivityTimer) based operation of a terminal receiving group common transmission. A data inactivity timer may correspond to a timer related to RRC release or transition from a RRC connected state to a RRC idle/inactive state.

When a MAC SDU of a traffic logical channel for a specific G-RNTI or a specific cast type, a terminal may start or restart dataInactivityTimer. If dataInactivityTimer expires, a MAC entity of a terminal may report expiration of a corresponding timer to a higher layer (e.g., a RRC entity). In a terminal in a RRC_CONNECTED mode, a RRC entity may release a RRC connection and switch/transit to a RRC_IDLE mode or a RRL_INACTIVE mode according to reporting on expiration of dataInactivityTimer. When a RRC_INACTIVE terminal receives reporting on expiration of dataInactivityTimer, it may switch/transit to a RRC_IDLE mode according to this reporting.

For example, a RRC_CONNECTED or RRC_INACTIVE terminal may start or restart dataInactivityTimer only when receiving a MAC SDU of a MTCH for a specific G-RNTI. It may not start or restart DataInactivityTimer when receiving a MAC SDU of a MTCH for other G-RNTI. Here, specific G-RNTI(s) may be configured by a base station for a terminal.

As another example, a RRC_CONNECTED or RRC_INACTIVE terminal may start or restart dataInactivityTimer only when receiving a MAC SDU of a MTCH for multicast.

It may not start or restart dataInactivityTimer When receiving a MAC SDU of a MTCH for broadcast.

As another example, a RRC_CONNECTED or RRC_INACTIVE terminal may start or restart dataInactivityTimer only when receiving a MAC SDU of a MTCH in a multicast CFR. It may not start or restart dataInactivityTimer when receiving a MAC SDU of a MTCH in a broadcast CFR.

As another example, a RRC_CONNECTED or RRC_INACTIVE terminal may start or restart dataInactivityTimer only when receiving a MAC SDU of a MTCH. It may not start or restart dataInactivityTimer when receiving a MAC SDU of a MCCH.

An underlined part in a table below may correspond to a MAC entity operation which may be changed according to the present disclosure based on an operation of the existing MAC entity.

TABLE 8

The UE may be configured by RRC with a Data inactivity monitoring functionality, when in RRC_CONNECTED. RRC controls Data inactivity operation by configuring the timer dataInactivityTimer.
    When dataInactivityTimer is configured, the UE shall:
1>    if any MAC entity receives a MAC SDU for DTCH logical channel, DCCH logical channel, or CCCH logical channel; or
1>    <u>if any MAC entity receives a MAC SDU for MTCH logical channel for multicast; or</u>
1>    if any MAC entity transmits a MAC SDU for DTCH logical channel, or DCCH logical channel:
2>    start or restart dataInactivityTimer.
1>    if the dataInactivityTimer expires:
2>    indicate the expiry of the dataInactivityTimer to upper layers.

In an example of Table 8, when dataInactivityTimer is configured, a terminal starts or restarts dataInactivityTimer when any MAC entity receives a MAC SDU for a MTCH logical channel for multicast (not broadcast).

Figure 10:
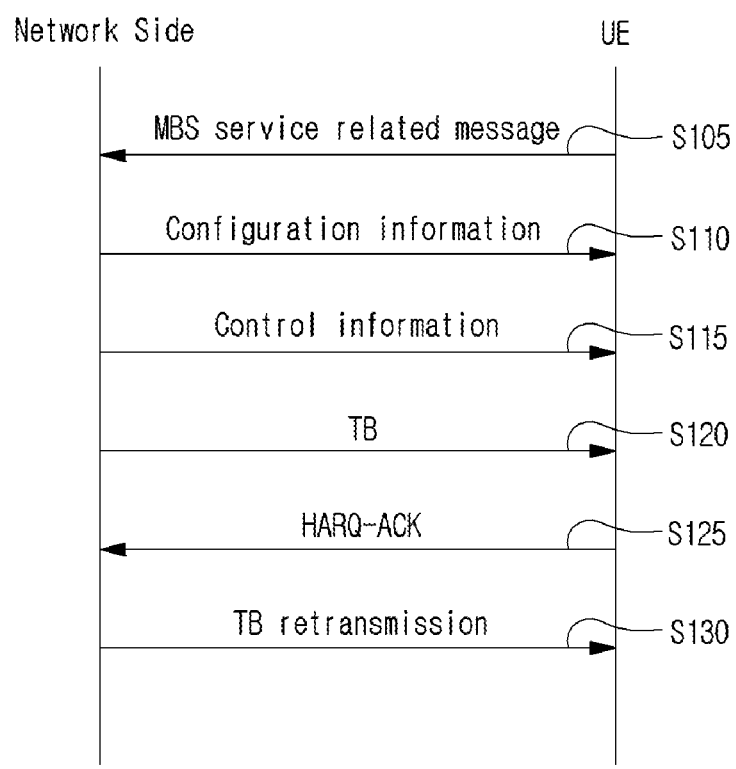
FIG. 10 is a diagram for illustrating a signaling process of a network side and a terminal according to an embodiment of the present disclosure.

FIG. 10 is a diagram for illustrating a signaling procedure of the network side and the terminal according to an embodiment of the present disclosure.

FIG. 10 shows an example of signaling between a network side and a terminal (UE) in a situation to which the examples (e.g., embodiments 1, 2, 3, 4, 5, 6, 7 or its detailed examples, and a combination of one or more thereof) of the present disclosure described above may be applied.

Here, the UE/network side is exemplary, and may be replaced with various devices to be described with reference to FIG. 11. FIG. 10 is for convenience of description, and does not limit the scope of the present disclosure. Also, some step(s) shown in FIG. 10 may be omitted depending on circumstances and/or settings. In addition, in the operation of the network side/UE of FIG. 10, the above-described uplink transmission/reception operation and the like may be referred to or used.

In the following description, the network side may be one base station including a plurality of TRPs, or may be one cell including a plurality of TRPs. Alternatively, the network side may include a plurality of remote radio heads (RRHs)/remote radio units (RRUs). As an example, an ideal/non-ideal backhaul may be configured between TRP 1 and TRP 2 included in the network side. In addition, although the following description is based on a plurality of TRPs, such description may be equivalently extended and applied to transmission through a plurality of panels/cells, and may also be extended and applied to transmission through a plurality of RRHs/RRUs.

In addition, although described with reference to "TRP" in the following description, "TRP" may be replaced with and applied to a panel, an antenna array, a cell (e.g., a macro cell/small cell/pico cell, etc.), TP (transmission point), base station (base station, gNB, etc.) as described above. As described above, the TRP may be distinguished according to information (e.g., CORESET index, ID) on the CORESET group (or CORESET pool).

As an example, when one UE is configured to perform transmission and reception with a plurality of TRPs (or cells), this may mean that a plurality of CORESET groups (or CORESET pools) are configured for the one UE. The configuration of such CORESET group (or CORESET pool) may be performed through higher layer signaling (e.g., RRC signaling, etc.).

In addition, the base station may mean a generic term for an object that transmits/receives data to and from the UE. For example, the base station may be a concept including one or more TPs (Transmission Points), one or more TRPs (Transmission and Reception Points), or the like. In addition, the TP and/or TRP may include a panel, a transmission and reception unit, and the like of the base station.

The UE may enter the RRC_CONNECTED mode, and may report a message indicating one or more interested MBS services to the network side (S105).

Here, the UE may transmit the message to the network side through at least one of UCI, MAC CE (Control Element), or RRC message. In addition, the MBS service of interest in the message may mean one of TMGI and G-RNTI listed in a DL message received from the network side.

For example, the DL message may be a service availability message listing TMGI #1, TMGI #3, TMGI #5, and TMGI #10. When the UE is interested in TMGI #5, the UE may indicate the order of TMGI #5 in the message. That is, the terminal may report '3' to the network side.

As an additional example, the DL message may be a service availability message listing G-RNTI #1, G-RNTI #3, G-RNTI #5, and G-RNTI #10. When the UE is interested in G-RNTI #10, the UE may indicate the order of G-RNTI #10 in the message. That is, the UE may report '4' to the network side.

For example, the operation of the UE (100 or 200 in FIG. 11) of the above-described step S105 transmitting the message to the network side (200 or 100 in FIG. 11) may be implemented by the device of FIG. 11 to be described below. For example, referring to FIG. 11, the one or more processors 102 may control one or more transceivers 106 and/or one or more memories 104, etc. to transmit the message, and the one or more transceivers 106 may transmit the message to the network side.

Upon receiving the message, the network side may transmit configuration information to the UE by an RRC message (S110).

For example, the configuration information may include CFR (common frequency resource) configuration information, one or more group common PDSCH configuration information including TCI states for one or more G-RNTI values, search space configuration information including TCI states for one or more G-RNTI values.

Here, the RRC message may be a group common message transmitted through a PTM MCCH (Multicast Control Channel) or a UE-dedicated message transmitted through a UE-specific DCCH (Dedicated Control Channel).

In addition, CFR may include DL CFR and UL CFR. For example, one DL CFR may provide group common PDCCH and group common PDSCH transmission resources for MBS transmission or reception. One UL CFR may provide HARQ-ACK PUCCH resources for group common PDSCH reception. One CFR may be one MBS-specific BWP or one UE-specific BWP. Additionally or alternatively, one or a plurality of CFRs may be configured in one UE-specific BWP. One CFR may have a linkage relationship with one UE-specific BWP.

The terminal may be configured with at least a G-RNTI value for each MBS CFR or each serving cell. GC-CS-RNTI may be configured/used for activation, retransmission or release of one or more group common SPS configurations.

When the UE is not configured with GC-CS-RNTI for CFR or serving cell, and CS-RNTI is configured for CFR or serving cell, the UE may use CS-RNTI for activating, retransmitting, or releasing of one or more group common SPS configurations.

The network side may associate one GC-CS-RNTI value with a TMGI list or a G-RNTI list. In this case, the network side may provide a TMGI list or a G-RNTI list associated with the GC-CS-RNTI value.

In addition, configuration information of each PDSCH (e.g., 'PDSCH-config') may be configured as shown in Table 9 as a minimum information element for multicast and/or broadcast.

described below. For example, referring to FIG. 11, the one or more processors 102 may control one or more transceivers 106 and/or one or more memories 104, etc. to receive the configuration information, and the one or more transceivers 106 may receive the configuration information from the network side.

The UE may receive control information from the network side (S115). For example, the UE may receive downlink control information (DCI) for scheduling/activating/releasing uplink/downlink transmission from the network side.

Specifically, when the search space is configured for the configured CFR, the UE may monitor the PDCCH in the SS (search space) configured in the configured CFR, to receive DCI CRC scrambled with G-RNTI or G (group)-CS (configured scheduling)-RNTI.

For example, the operation of the UE (100 or 200 in FIG. 11) of the above-described step S115 receiving control information from the network side (200 or 100 in FIG. 11) may be implemented by the device of FIG. 11 to be described below. For example, referring to FIG. 11, the one or more processors 102 may control one or more transceivers 106 and/or one or more memories 104, etc. to receive the control information, and the one or more transceivers 106 may receive the control information from the network side.

The UE may receive the TB from the network side (S120).

Specifically, when the data unit is available on the MTCH of the MBS radio bearer (MRB) for the MBS service, the network side may construct and transmit a TB including the data unit for an SPS PDSCH occasion associated with the MTCH of the MRB for the MBS service, or associated with TMGI of the MBS service, or associated with a short ID of the MBS service, or associated with G-RNTI mapped to the MBS service, according to the service-to-resource mapping.

For group common dynamic scheduling of the TB, the network side may transmit DCI through PDCCH to the UE.

TABLE 9

```
PDSCH-Config ::= SEQUENCE {
dataScramblingIdentity PDSCH INTEGER (0..1023) OPTIONAL, -- Need S
dmrs-DownlinkForPDSCH-MappingTypeA SetupRelease { DMRS-DownlinkConfig }
OPTIONAL, -- Need M
dmrs-DownlinkForPDSCH-MappingTypeB SetupRelease { DMRS-DownlinkConfig }
OPTIONAL, -- Need M
tci-StatesToAddModList SEQUENCE (SIZE(1..maxNrofTCI-States)) OF TCI-State
OPTIONAL, -- Need N
tci-StatesToReleaseList SEQUENCE (SIZE(1..maxNrofTCI-States)) OF TCI-StateId
OPTIONAL, -- Need N
vrb-ToPRB-Interleaver ENUMERATED {n2, n4} OPTIONAL, -- Need S
resourceAllocation ENUMERATED { resourceAllocationType0, resourceAllocationType1,
dynamicSwitch},
pdsch-TimeDomainAllocationList SetupRelease { PDSCH-
TimeDomainResourceAllocationList } OPTIONAL, -- Need M
pdsch-AggregationFactor ENUMERATED { n2, n4, n8 } OPTIONAL, -- Need S
rateMatchPatternToAddModList SEQUENCE (SIZE (1..maxNrofRateMatchPatterns)) OF
RateMatchPattern OPTIONAL, -- Need N
rateMatchPatternToReleaseList SEQUENCE (SIZE (1..maxNrofRateMatchPatterns)) OF
RateMatchPatternId OPTIONAL, -- Need N
rateMatchPatternGroup1 RateMatchPatternGroup OPTIONAL, -- Need R
rateMatchPatternGroup2 RateMatchPatternGroup OPTIONAL, -- Need R
rbg-Size ENUMERATED {config1, config2},
mcs-Table ENUMERATED {qam256, qam64LowSE} OPTIONAL, -- Need S
maxNrofCodeWordsScheduledByDCI ENUMERATED {n1, n2}
... }
```

Figure 11:
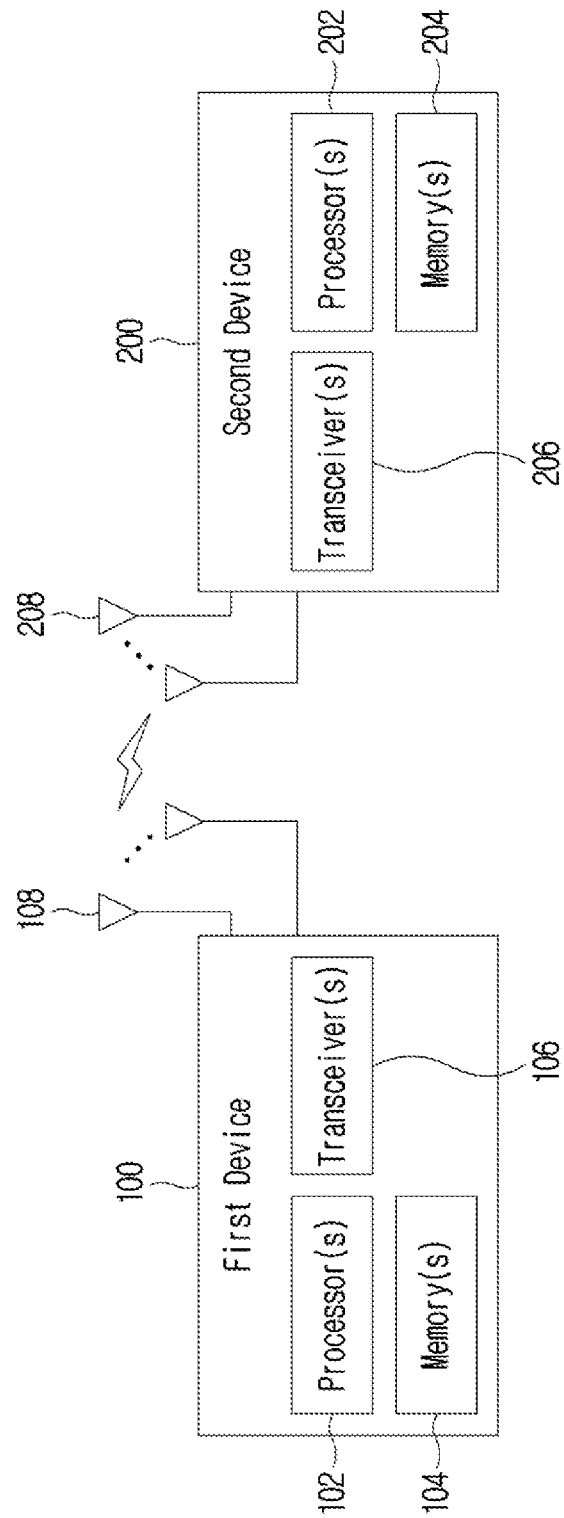
FIG. 11 illustrates a block diagram of a wireless communication device according to an embodiment of the present disclosure.

For example, the operation of the UE (100 or 200 in FIG. 11) of the above-described step S110 receiving configuration information from the network side (200 or 100 in FIG. 11) may be implemented by the device of FIG. 11 to be The corresponding DCI may be CRC scrambled by G-RNTI, G-CS-RNTI, or CS-RNTI. The PDCCH may be implemented as a group common PDCCH or a UE-specific PDCCH.

For example, the DCI may include at least one of an identifier for the DCI format, a carrier indicator, a bandwidth part indicator, frequency domain resource assignment, time domain resource assignment, VRB-to-PRB mapping, PRB bundling size indicator, rate matching indicator, ZP CSI-RS trigger, MCS, NDI, RV, HARQ process number, downlink assignment index, TPC command for scheduled PUCCH, PUCCH resource indicator, PDSCH-to-HARQ_feedback timing indicator, an antenna port, a transmission configuration indication, an SRS request, a DMRS sequence initialization, or a priority indicator.

For group common dynamic scheduling, by group common or UE-specific RRC message or by group common or UE-specific MAC CE, the network side may provide with UE one or more of the service-resource mappings for the MBS service identified by TMGI or G-RNTI or GC-CS-RNTI. Data of the MBS service may be carried through MBS radio bearer (MRB) of a multicast traffic logical channel, that is, MTCH associated to the MBS service. RRC message may be a group common message transmitted through PTM MCCH (Multicast Control Channel) or UE-dedicated message transmitted through UE-specific DCCH (Dedicated Control Channel). The DCI scheduling PDSCH carrying the MBS service data may additionally indicate at least one of short ID, MTCH ID, MRB ID, G-RNTI value, and a TMGI value for the MBS service.

When receiving DCI CRC scrambled by G-RNTI that the UE is interested to receive, the UE may determine MBS service(s) associated with one or more of short ID, MTCH ID, MRB ID, G-RNTI value, and a TMGI value for each PDSCH occasion, based on mapping between MBS service and HPN indicated in the DCI, and/or mapping between MBS service and short ID(s) indicated in the DCI.

Then, when UE is interested in the determined MBS service(s), the UE may receive PDSCH transmission scheduled by the DCI. When the UE is not interested in the determined MBS service(s), UE may not receive PDSCH transmission scheduled by the DCI.

For example, the operation of the UE (100 or 200 in FIG. 11) of the above-described step S120 receiving the TB from the network side (200 or 100 in FIG. 11) may be implemented by the device of FIG. 11 to be described below. For example, referring to FIG. 11, the one or more processors 102 may control one or more transceivers 106 and/or one or more memories 104, etc. to receive the TB, and the one or more transceivers 106 may receive the TB from the network side.

Upon receiving group common DCI indicating PUCCH resource(s) for MBS HARQ-ACK, the UE may transmit HARQ-ACK through PUCCH after a PDSCH reception scheduled by the DCI (S125). That is, according to decoding status of PDSCH transmission, the UE may transmit HARQ feedback to the network side.

In the case of PTM scheme 1, group common DCI may indicate a single PUCCH resource indicator and a single PDSCH-to-HARQ_feedback timing indicator at least for ACK/NACK based HARQ-ACK.

Specifically, in the case of UE-specific PUCCH resource allocation for ACK/NACK based HARQ-ACK for group common DCI, different UEs in the corresponding group (unless 'PUCCH-config' for multicast is configured) may be configured with different values of at least 'PUCCH-Resource' and 'dl-DataToUL-ACK' in UE-dedicated 'PUCCH-config' for multicast or for unicast. Different UEs may be allocated with different PUCCH resources, by the same PUCCH resource indicator and the same 'PDSCH-to-HARQ_feedback timing indicator of the group common DCI.

In the case of PTP retransmission, the PUCCH resource indicator and the PDSCH-to-HARQ_feedback timing indicator in the UE-specific DCI may be interpreted based on 'PUCCH-config' for unicast, regardless of whether 'PUCCH-config' for multicast is configured or not.

Here, PRI (PUCCH Resource Indicator) may be indicated by group common DCI as follows.

As an example, UE-specific PRI list may be included in the DCI (option 1A-1). Each PRI in the corresponding list may indicate an entry corresponding to a candidate 'pucch-ResourceId' value of 'PUCCH-config' for allocation of the same PUCCH resource or different PUCCH resources for different UEs in the group receiving the same DCI. Different PRI of DCI may indicate different entry in 'PUCCH-config.'

Here, a candidate 'pucch-ResourceId; value may be configured by RRC, and a different 'pucch-ResourceId' value may be configured for a different UE in the same group at least in multicast PUCCH-config.

As an additional example, a group common PRI may be included in the DCI (option 1-A-2). A single group common PRI may indicate a specific entry for a candidate 'pucch-ResourceId' value in UE-specific 'PUCCH-config' for allocation of the same or different PUCCH resources for all UEs in the group.

In addition, a candidate 'pucch-ResourceId' value may be configured by RRC. Different 'pucch-ResourceId' value may be configured for different UE in the same group at least in 'PUCCH-config' for multicast.

When 'PUCCH-config' for multicast is configured for HARQ-ACK for group common PDSCH scheduled by the group common DCI, the UE may assume that the PRI of the group common DCI indicates an entry corresponding to a candidate 'pucch-ResourceId' value in 'PUCCH-config' for multicast.

When 'PUCCH-config' for multicast is not configured for HARQ-ACK for group common PDSCH scheduled by the group common DCI, the UE may assume that the PRI of the group common DCI indicates an entry corresponding to a candidate 'pucch-ResourceId' value in 'PUCCH-config' for unicast.

K1 (PDSCH-to-HARQ_feedback timing indicator) may be indicated by group common DCI as follows.

As an example, UE-specific K1 value list may be included in the DCI (option 1B-1). Each K1 in the list may indicate the same UL slot or different UL (sub-)slot for different UE in the group.

For example, Different K1 values may be allocated to different UEs. That is, K1 may be allocated to UE1, K2 may be allocated to UE2, K3 may be allocated to UE3.

As an additional example, multiple UEs may share K1 value. For example, UE1 and UE2 may share K1 value, UE3 and UE4 may share K2 value.

As an additional example, one K1 value may be a reference, and other K1 value may be allocated based on the reference. {K1_ref, K1_offset list} may be indicated by DCI.

For example, UE1 may use K1 ref, UE2 may use K1_ref+K1_offset1, UE3 may use K1_ref+K1_offset2.

As an additional example, group common K1 value may be included in the DCI (option 1B-2). For example, a single K1 value may indicate an entry corresponding to a candidate 'dl-DataToUL-ACK' values in UE-specific 'PUCCH-config' for allocation of the same or different PUCCH resources for all UEs in the group receiving the DCI. This may be applied for the case that a DCI format is configured in UE-specific 'PUCCH-config' for the K1 value.

As an additional example, a candidate 'dl-DataToUL-ACK' value may be configured by RRC, and may be differently configured for different UE in the same group at least in 'PUCCH-config' for multicast.

As an additional example, when 'PUCCH-config' for multicast is configured for HARQ-ACK for group common PDSCH scheduled by group common DCI, UE may assume that K1 value of the group common DCI indicates an entry corresponding to a candidate 'dl-DataToUL-ACK' value in 'PUCCH-config' for multicast.

As an additional example, when 'PUCCH-config' for multicast is not configured for HARQ-ACK for group common PDSCH scheduled by group common DCI, UE may assume that K1 value of the group common DCI indicates an entry corresponding to a candidate 'dl-DataToUL-ACK' value in 'PUCCH-config' for unicast.

In addition, when the UE receives group common DCI CRC scrambled by G-RNTI and/or UE-specific DCI CRC scrambled by C-RNTI, and when Type-1 HARQ-ACK codebook is configured for 'PUCCH-config' for multicast and/or 'PUCCH-config' for unicast, UE may construct TDRA (Time Domain Resource Allocation) to generate Type-1 HARQ-ACK codebook for HARQ-ACK(s) for group common PDSCH scheduled by group common DCI and/or UE-specific PDSCH scheduled by UE-specific DCI.

When TB decoding in a PDSCH transmission occasion is not successful, UE may transmit HARQ NACK to the network side through a PUCCH resource in the configured UL CFR.

Using PUCCH resource, the UE may transmit HARQ-ACK for other PDSCH transmissions such as unicast SPS PDSCH, dynamic unicast PDSCH, PTP retransmission and/or dynamic group common PDSCH.

Here, for multiplexing HARQ-ACKs on PUCCH in a (sub)slot for SPS PDSCH for multicast, SPS PDSCH for unicast, dynamically scheduled multicast PDSCH, and/or dynamically scheduled unicast PDSCH, UE may construct a codebook based on one or more of the above options.

When RSRP threshold is configured, the UE may use NACK only based HARQ-ACK based on the measured RSRP of a serving cell. When the measured RSRP is higher than a threshold, NACK only based HARQ-ACK may be transmitted through group common PUCCH resource indicated by PRI of DCI. When the measured RSRP is lower than the threshold, NACK only based HARQ-ACK may be transformed into ACK/NACK based HARQ-ACK on UE-specific PUCCH resource indicated by PRI of DCI.

Meanwhile, when the 'pdsch-AggregationFactor' is configured for a G-RNTI or when 'repetition number' is indicated by the network side by DCI, the TB scheduled by group common DCI may be repeated for Nth HARQ transmission of the TB within each symbol allocation among each of the 'pdsch-AggregationFactor' consecutive slots or among each of the 'repetition number' consecutive slots, if configured.

For example, the operation of the UE (100 or 200 in FIG. 11) of the above-described step S125 transmitting the HARQ-ACK to the network side (200 or 100 in FIG. 11) may be implemented by the device of FIG. 11 to be described below. For example, referring to FIG. 11, the one or more processors 102 may control one or more transceivers 106 and/or one or more memories 104, etc. to transmit the HARQ-ACK, and the one or more transceivers 106 may transmit the HARQ-ACK to the network side.

Receiving HARQ NACK of a TCI state, the network side may retransmit, using the TCI state, PDCCH and PDSCH in the DL CFR configured for retransmission of TB (S130).

UE may monitor group common and/or UE-specific PDCCH using the TCI state for a search space configured in DL CFR to receive a retransmission of the TB. The network side may retransmit the TB to one of the UEs in the group by UE-specific PDCCH. Meanwhile, other UE(s) may not receive the retransmission of the TB, as it has successfully received the TB.

When the UE receives the PDCCH for the retransmission of the TB, the UE may receive the PDSCH scheduled by the DCI of the PDCCH. When the UE successfully decodes the TB in the PDSCH, the UE may consider that the decoded TB is associated with MTCH, MRB, TMGI, G-RNTI and/or short ID of MBS service, based on mapping between MBS service and HPN (HARQ Process Number) indicated by the DCI, and/or mapping between MBS service and short ID(s) indicated by the DCI.

When TB decoding in PDSCH transmission occasion is successful, the UE may transmit HARQ ACK to the network side through PUCCH resource in UL CFR configured according to the above-described procedure. Using PUCCH resource, the UE may transmit HARQ-ACK for other PDSCH transmission such as unicast SPS PDSCH, dynamic unicast PDSCH, PTP retransmission and/or dynamic group common PDSCH.

In this case, for multiplexing HARQ-ACKs on PUCCH in a (sub)slot for SPS PDSCH for multicast, SPS PDSCH for unicast, dynamically scheduled multicast PDSCH, and/or dynamically scheduled unicast PDSCH, the UE may construct a codebook based on one or more of the above-described options/embodiments.

For example, the operation of the UE (100 or 200 in FIG. 11) of the above-described step S130 receiving TB retransmission from the network side (200 or 100 in FIG. 11) may be implemented by the device of FIG. 11 to be described below. For example, referring to FIG. 11, the one or more processors 102 may control one or more transceivers 106 and/or one or more memories 104, etc. to receive TB retransmission, and the one or more transceivers 106 may receive TB retransmission from the network side.

General Device to which the Present Disclosure May be Applied

FIG. 11 is a diagram which illustrates a block diagram of a wireless communication device according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102.

For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods included in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method performed by a terminal in a wireless communication system, the method comprising:
   receiving, from a network, a physical downlink control channel (PDCCH) on a first bandwidth part (BWP) based on a first group-radio network temporary identifier (G-RNTI) or a second G-RNTI; and
   receiving, from the network, a group common physical downlink shared channel (PDSCH) based on the PDCCH,
   wherein the first G-RNTI is configured for a multicast group common scheduling, and the second G-RNTI is configured for a broadcast group common scheduling, and
   wherein a BWP-inactivity timer is started or restarted based on the PDCCH addressed to the first G-RNTI configured for the multicast group common scheduling.

2. The method of claim 1, wherein:
   a BWP switching to a second BWP is performed based on an expiry of the BWP- inactivity timer.

3. The method of claim 2, wherein:
   the first BWP is an active BWP, and
   the second BWP is an initial BWP or a default BWP.

4. The method of claim 1, wherein:
   a data-inactivity timer is started or restarted based on a medium access control service data unit (MAC SDU) related to the multicast group common scheduling.

5. The method of claim 4, wherein:
based on an expiry of the data-inactivity timer in an radio resource control (RRC) connected state, an action upon going to an RRC idle state is performed.

6. The method of claim 1, wherein:
the PDCCH corresponds to a first type downlink control information (DCI) format or a second type DCI format,
the first type DCI format is cyclic redundancy check (CRC) scrambled by the first G-RNTI configured for the multicast group common scheduling, and schedules the PDSCH reception, and
the second type DCI format is CRC scrambled by the second G RNTI configured for the broadcast group common scheduling, and schedules the PDSCH reception.

7. The method of claim 1, wherein:
the BWP-inactivity timer is not started and not restarted based on the PDCCH addressed to a-the second G-RNTI configured for the broadcast group common scheduling.

8. The method of claim 4, wherein:
the data-inactivity timer is not started and not restarted based on a MAC SDU related to the broadcast group common scheduling.

9. A terminal in a wireless communication system, the terminal comprising:
at least one transceiver; and
at least one processor connected to the at least one transceiver,
wherein the at least one processor is configured to:
receive, from a network through the at least one transceiver, a physical downlink control channel (PDCCH) on a first bandwidth part (BWP) based on a first group-radio network temporary identifier (G-RNTI) or a second G-RNTI; and
receive, from the network through the at least one transceiver, a group common physical downlink shared channel (PDSCH) based on the PDCCH,
wherein the first G-RNTI is configured for a multicast group common scheduling, and the second G-RNTI is configured for a broadcast group common scheduling, and
wherein a BWP-inactivity timer is started or restarted based on the PDCCH addressed to the first G-RNTI configured for the multicast group common scheduling.

10. A base station in a wireless communication system, the base station comprising:
at least one transceiver; and
at least one processor connected to the at least one transceiver,
wherein the at least one processor is configured to:
transmit, to at least one terminal through the at least one transceiver, a physical downlink control channel (PDCCH) on a first bandwidth part (BWP) based on a first group-radio network temporary identifier (G-RNTI) or a second G-RNTI; and
transmit, to the at least one terminal through the at least one transceiver, a group common physical downlink shared channel (PDSCH) based on the PDCCH,
wherein the first G-RNTI is configured for a multicast group common scheduling, and the second G-RNTI is configured for a broadcast group common scheduling, and
wherein a BWP-inactivity timer is started or restarted based on the PDCCH addressed to the first G-RNTI configured for the multicast group common scheduling.

* * * * *